United States Patent
Tenne et al.

(10) Patent No.: US 7,641,869 B2
(45) Date of Patent: Jan. 5, 2010

(54) METHOD AND APPARATUS FOR PRODUCING INORGANIC FULLERENE-LIKE NANOPARTICLES

(75) Inventors: Reshef Tenne, Rehovot (IL); Yishay Feldman, Ashdod (IL); Alla Zack, Rehovot (IL); Rita Rosentsveig, Rehovot (IL)

(73) Assignee: Yeda Research and Development Company Ltd., Rehovot (IL)

(*) Notice: Subject to any disclaimer, the term of this patent is extended or adjusted under 35 U.S.C. 154(b) by 252 days.

(21) Appl. No.: 11/326,462

(22) Filed: Jan. 6, 2006

(65) Prior Publication Data

US 2006/0120947 A1 Jun. 8, 2006

Related U.S. Application Data

(63) Continuation of application No. 10/415,089, filed as application No. PCT/IL01/00990 on Oct. 25, 2001, now Pat. No. 7,018,606.

(30) Foreign Application Priority Data

Oct. 25, 2000 (IL) .................................. 139266

(51) Int. Cl.
- B01J 10/00 (2006.01)
- D01C 5/00 (2006.01)
- H01M 4/58 (2006.01)

(52) U.S. Cl. .................. 422/198; 423/447.3; 423/561.1; 423/509; 423/445 B; 977/843

(58) Field of Classification Search ................. 422/198; 423/561.1, 447.3, 509, 445 B; 977/843
See application file for complete search history.

(56) References Cited

U.S. PATENT DOCUMENTS

| 3,790,349 A | 2/1974 | Andreichev |
| 4,132,763 A | 1/1979 | Schmidt et al. |
| 4,705,702 A | 11/1987 | Shimada et al. |
| 5,352,430 A | 10/1994 | McCulfor et al. |
| 5,413,773 A | 5/1995 | Tibbetts et al. |

(Continued)

FOREIGN PATENT DOCUMENTS

| WO | WO 97/44278 | 11/1997 |
| WO | WO 98/23796 A1 | 6/1998 |
| WO | 0066485 A1 | 11/2000 |

OTHER PUBLICATIONS

Zak et al, Growth Mechanism of MoS2 Fullerene-like Nanoparticles by Gas-Phase Syhtesis, 2000, J. Am. Chem. Soc., 122, 11108-11116.*

(Continued)

Primary Examiner—Walter D Griffin
Assistant Examiner—Natasha Young
(74) Attorney, Agent, or Firm—Browdy and Neimark, PLLC

(57) ABSTRACT

A process and apparatus are presented for obtaining inorganic fullerene-like nanostructures. A metal oxide is evaporated at predetermined temperature conditions, and is swept towards a reacting zone, to which first and second gas phase reacting agents are concurrently swept. The evaporated metal oxide thus interacts with the first reacting agent and is converted into metal suboxide nanoparticles in the gas phase. The condensing metal suboxide nanoparticles interact with the second reacting agent in the gas phase resulting in substantially pure phase of the inorganic fullerene-like nanoparticles.

43 Claims, 12 Drawing Sheets

U.S. PATENT DOCUMENTS

| | | | |
|---|---|---|---|
| 5,472,477 | A | 12/1995 | Konig |
| 5,958,358 | A | 9/1999 | Tenne et al. |
| 6,007,869 | A | 12/1999 | Schreiber et al. |
| 6,217,843 | B1 | 4/2001 | Homyonfer et al. |
| 6,221,330 | B1 * | 4/2001 | Moy et al. ............... 423/447.3 |
| 6,468,497 | B1 | 10/2002 | Khan et al. |
| 2004/0013602 | A1 | 1/2004 | Taube |
| 2004/0018306 | A1 | 1/2004 | Tenne et al. |
| 2004/0089410 | A1 | 5/2004 | Tenne et al. |
| 2004/0105808 | A1 | 6/2004 | Tenne et al. |

OTHER PUBLICATIONS

European Patent Office, Patent Abstracts Of Japan: Abstract for JP 03261623, "Production Device of Uranium Hexafluoride", Mitsubishi Materials Corp (Nov. 21, 1991).

Y. Feldman et al., "New Reactor for Production of Tungsten Disulfide Hollow Onion-Like (Inorganic Fullerene-Like) Nanoparticles", *Solid State Sciences,* vol. 2, No. 4, pp. 663-672 (Jun. 1, 2000).

Homyonfer et al., "Intercalation Of Inorganic Fullerene-Like Structures Yields Photosensitive Films And New Tips For Scanning Probe Microscopy", *J. Am. Chem. Soc.,* vol. 119, pp. 2693-2698 (1997).

Magneli, "Some Aspects Of The Crystal Chemistry Of Oxygen Compounds Of Molybdenum And Tungsten Containing Structural Elements of $ReO_3$ or Perovskite Type", *J. Inorg. Nucl. Chem.,* vol. 2, pp. 330-339 (1956).

Prasad et al., "Super Slippery Solids", *Nature,* vol. 387, p. 761 (Jun. 19, 1997).

Rapoport et al., "Inorganic Fullrene-Like Material As Additives to Lubricants: Structure-Function Relationship", *Wear,* 225-229, pp. 975-982 (1999).

Remskar et al., "$MoS_2$ Microtubes: An Electron Microscopy Study", *Surface Review and Letters,* vol. 5, No. 1, pp. 423-426 (1998).

Rothschild et al., "Growth of $WS_2$ Nanotubes Phases", *J. Am. Chem. Soc.,* vol. 122, pp. 5169-5179 (2000).

Tenne et al., "Synthesis And Properties Of Encapsulated And Intercalated Inorganic Fullerene-Like Structures", *Advances in Metal and Semiconductor Clusters,* vol. 4, pp. 227-252 (1998).

Tsirlina et al., "Synthesis And Characterization Of Inorganic Fullerene-Like $Wse_2$ Material", *Fullerene Science and Technology,* vol. 6(1), pp. 157-165 (1998).

Vollath et al., "Synthesis of Nanocrystalline $MoS_2$ and $WS_2$ in a Microwave Plasma", *Material Letters,* vol. 35, pp. 236-244 (May 1998).

"Science of Fullerenes and Carbon Nanotubes," M.S. Dresselhaus et al, Academic Press, Inc, 1996, pp. 1-6, 110-116.

Flagen, R.C. et al, "Particle Structure Control in Nanoparticle Synthesis from the Vapor Phase," Materials Science and Engineering A204 (1995), pp. 113-124.

Deppert, K et al, "Feasibility Study of Nanoparticle Synthesis from Powders of Compounds with Incongruent Sublimation Behavior by the Evaporation/Condensation Method," Nanostructured Materials 1998, vol. 10, No. 4, pp. 565-573.

Kruis, F.E. et al, "Synthesis of Nanoparticles in the Gas Phase for Electronic, Optical and Magnetic Applications," J. Aerosol Sci., 1998, vol.,No. 5/6, pp. 511-535.

Kroto, H.W. et al, "$C_{60}$: Buckinsterfullerene," Nature, Nov. 14, 1985, vol. 318, pp. 162-163.

Krätschmer, W. et al,"Solid $C_{60}$ : A New Form of Carbon," Nature, Sep. 27, 1990, vol. 347, pp. 354-358.

Jose-Yacaman, M. et al, "Studies of $MoS_2$ Structures Produced by Electron Irradiation," Appl. Phys. Lett., Aug. 19, 1996, 69)8), pp. 1065-1067.

Parilla, P.A. et al, "The First True Inorganic Fullerenes?," Nature, Jan. 14, 1999, vol. 397, p. 114.

Homyonfer, M. et al, "Scanning Tunneling Microscope Induced Crystallization of Fullerene-like $MoS_2$ ," J. Am. Chem. Soc. 1996, 118, pp. 7804-7808.

Rosenfeld-Hacohen, Y. et al, "Cage Structures and Nantubes of $NiCl_2$ ," Nature, Sep. 24, 1998, Vo. 395, pp. 336-337.

Chhowalla, M. et al, "Thin Films of Fullerene-like $MoS_2$ Nanoparticles with Ultra-low Friction and Wear," Nature, Sep. 14, 2000, vol. 407, pp. 164-167.

Tenne, R. et al, "Polyhedral and Cylindrical Structures of Tungsten Disulphide," Nature, Dec. 3, 1992, vol. 360, pp. 444-445.

Margulis, L. et al, "Nested Fullerene-Like Structures," Nature, Sep. 9, 1993, vol. 365, pp. 113-114.

Hershfinkel, M. et al, "Nested Polyhedra of $MX_2$ (M=W, Mo; X=S, Se) Probed by High-Resolution Electron Microscopy and Scanning Tunneling Microscopy," J. Am. Chem. Soc. 1994, 116, pp. 1914-1917.

Feldman, Y. et al, "High-Rate, Gas-Phase Growth of MOS Nested Inorganic Fullerenes and Nanatubes," Science, American Association for the Advancement of Science, U.S., vol. 267, 13, Jan. 1995, pp. 222-225.

Feldman, Y. et al, "Bulk Synthesis of Inorganic Fullerene-like $MS_2$ (M=Mo, W) from the Respective Trioxides and the Reaction Mechanism," J. Am. Chem. Soc., 1996, 118, pp. 5362-5367.

Rothschild, A. et al, "Synthesis of Bulk $WS_2$ Nanotube Phases," Mat. Res. lnnovat. 1999, 3, pp. 145-149.

Feldman, Y. et al, "Kinetiks of Nested Inorganic Fullerene-like Nanoparticle Formation," Am. Chem. Soc. 1998, 120, pp. 4176-4183.

Remskar, M. et al, "$MoS_2$ as Microtubes," Appl. Phys. Lett., Jul. 15, 1996, 69(3), pp. 351-353.

Remskar, M. et al, "New Crystal Structures of $WS_2$ : Microtubes, Ribbons, and Ropes," Adv. Mater., 1998, 10, No. 3, pp. 246-248.

Zelenski, C.M. et al, "Template Synthesis of Near-Monodisperse Microscale Nonofibres and Nonotubules of $Mos_2$ ," J. Am. Chem. Soc., 1998, 120, pp. 734-742.

Mastai, Y. et al, "Room Temperature Sonoelectrochemical Synthesis of Molybdenum Sulfide Fullerene-Like Nanoparticles," Adv. Mater. 1999, 11, No. 12, pp. 1010-1013.

Avivi, S. et al, "Sonochemical Hydrolysis of $Ga^3$ + Ions: Synthesis of Scroll-like Cylindrical Nanoparticles of Gallium Oxide Hydroxide," J. Am. Chem. Soc., 1999, 121, pp. 4196-4199.

Avivi, S. et al, "A New Fullerene-like Inorganic Compound Fabricated by the Sonolysis of an Aqueous Solution of TIC13," J. Am. Chem. Soc., 2000, 122, pp. 4331-4334.

Teene, R. et al, "Nanoparticles of Layered Compounds with Hollow Cage Structures (Inorganic Fullerene-Like Structures)," Chemistry of Materials, American Chemical Society, Washington, US, vol. 10, No. 11, Nov. 11, 1998, pp. 3225-3238.

Feldman, Y. et al., New Receptor for Production of Tungsten Disulified Hollow Onion-Like (Inorganic Fullerene-Like) Nanoparticles, Solid State Science, 2(6)663-672 (Oct. 1, 2000).

Margulis, L. et al, "Nested Fullerene-Like Structures," Nature, Sep. 9, 1993, vol. 365, pp. 113-114.

Hershfinkel, M. et al, "Nested Polyhedra of $MX_2$ (M=W, Mo; X=S, Se) Probed by High-Resolution Electron Microscopy and Scanning Tunneling Microscopy," J. Am. Chem. Soc. 1994, 116, pp. 1914-1917.

Tenne et al., Fullerene-like nanocrystals of tungsten disulfide, Advanced Materials, 5(5):386-388 (1993).

Rapoport et al., Hollow nanoparticles of WS2 as potential solid-state lubricants, Nature Macmillan Magazines UK, 287(6635)791-793 (1993).

* cited by examiner

METHOD AND APPARATUS FOR PRODUCING INORGANIC FULLERENE-LIKE NANOPARTICLES

CROSS-REFERENCE TO RELATED APPLICATIONS

The present application is a continuation of Ser. No. 10/415,089, which is a 371 national stage application of PCT/IL01/00990, filed Oct. 25, 2001. The entire content of both applications are incorporated herein by reference.

FIELD OF THE INVENTION

This invention relates to a chemical method and apparatus for producing inorganic fullerene-like nanoparticles.

BACKGROUND OF THE INVENTION

Inorganic fullerene-like nanoparticles and nanotubes are attractive due to their unique crystallographic morphology and their interesting physical properties. Molybdenum disulfide belongs to a class of solid lubricants useful in vacuum, space and other applications where liquids are impractical to use.

It is known to obtain carbon fullerenes and nanotubes by a synthetic process consisting of condensation of molecular clusters from the vapor phase. This is disclosed for example in the following publication:
(1) Dresselhaus, M. S.; Dresselhaus, G.; Eklund, P. C. *Science of Fullerenes and Carbon Nanotubes*; Academic Press, INC, 1996; pp 1-6, 110-116;
(2) Flagen, R. C.; Lunden, M. M. *Materials Sc. Eng. A* 1995, 204, 113;
(3) Deppert, K.; Nielsch, K.; Magnusson, M. H.; Kruis, F. E.; Fissan, H. *Nanostructured Materials* 1998, 10, 565; and
(4) Kruis, F. E.; Fissan, H.; Peled, A. *J. Aerosol Sci.* 1998, 29, 511.

According to this technique, a hot vapor is quenched and entrained by a flowing inert gas. Nanoclusters are obtained by an adiabatic expansion of the vapor leading to a cooling down of the clusters-inert gas vapor and its condensation. Fullerene-related nanoparticles are derived from materials with a layered structure.

There are three main types of fullerene-related particles: fullerenes ($C_{60}$, $C_{70}$, etc.); nested-fullerene nanoparticles (onions), and nanotubes. Analogous fullerene-like nanoparticles can be obtained from a number of inorganic materials with layered structure, which are known as inorganic fullerene-like materials-IF.

Fullerenes can be produced from carbon-rich vapor or plasma, which can be obtained using laser ablation, arc discharge or resistive heating of graphite targets, as disclosed in the above publication (4), as well as in the following publications:
(5) Kroto, H. W.; Heath, J. R.; O'Brien, S. C.; Curl, R. F.; Smally, R. E. *Nature* 1985, 318, 162;
(6) Kratschmer, W.; Lamb, L. D.; Fostiropoulos, K.; Huffman, R. *Nature* 1990, 347, 354.

Techniques for obtaining fullerene-like nanoparticles of $MoS_2$ from $MoS_2$ powder subjecting the powder to e-beam irradiation and laser ablation are disclosed in the following publications:
(7) Jose-Yacaman, M.; Lorez, H.; Santiago, P.; Galvan, D. H.; Garzon, I. L.; Reyes, A. *Appl.Phys. Lett.* 1996, 69, 8, 1065;
(8) Parilla, P. A.; Dillon, A. C.; Jones, K. M.; Riker, G.; Schulz, D. L.; Ginley, D. S.; Heben, M. J. *Nature* 1999, 397, 114.

According to another known techniques, short electrical pulses from the tip of a scanning tunneling microscope over a film consisting of amorphous $MoS_3$ nanoparticles, can be used to cause the formation of nanoparticles with a closed $MoS_2$ shell (IF), a few molecular layers thick, and amorphous $MoS_3$ core. This is disclosed for example in the following publication:
(9) Homyonfer, M.; Mastai, Y.; Hershfinkel, M.; Volterra, V.; Hutchison, J. L.; Tenne, R. *J. Am. Chem. Soc.* 1996, 118, 33, 7804.

A technique of obtaining closed cages and nanotubes of $NiCl_2$ has been recently developed and disclosed in the publication:
(10) Rosenfeld-Hacohen, Y., Grinbaum, E., Sloan, J., Hutchison, J. L. & Tenne, R., *Nature* 1998, 395, 336.

According to the above technique, heating of $NiCl_2$ to 960° C. in a reducing atmosphere is utilized.

As recently reported by Chhowalla and Amaratunga in *Nature* 407, 164 (2000), clusters of hollow fullerene-like $MoS_2$ "onions" can be produced in the form of thin films.

IF nanoparticles, including nanotubes, may also be obtained by chemical methods. The first synthesis of IF-$MS_2$ (M=Mo,W) is based on the sulfidization of the respective amorphous $MO_3$ thin films in a reducing atmosphere at elevated temperatures (~850° C.). This technique has been developed by the inventor of the present application, and are disclosed in the following publications:
(11) Tenne, R.; Margulis, L.; Genut, M.; Hodes, G. *Nature* 1992, 360, 444;
(12) Margulis, L.; Salitra, G.; Tenne, R.; Talianker, M. *Nature* 1993, 365, 113;
(13) Hershfinkel, M.; Gheber, L. A.; Volterra, V.; Hutchison, J. L.; Margulis, L.; Tenne, R. *J. Am. Chem. Soc.* 1994, 116, 1914.

As further found by the inventors of the present application, the synthesis of IF-$MoS_2$ including $MoS_2$ nanotubes can be carried out by using molybdenum oxide powder instead of a thin film precursor. This is disclosed in the following publication:
(14) Feldman, Y.; Wasserman, E.; Srolovitz, D. J.; Tenne, R. *Science* 1995, 267, 222.

However, the above synthesis resulted in miniscule amounts of the nanoparticles and a limited size control.

More recently, macroscopic quantities of IF-$WS_2$ and $WS_2$ nanotubes were obtained from a powder of tungsten oxide nanoparticles. These techniques are disclosed in the following publications:
(15) Feldman, Y.; Frey, G. L.; Homyonfer, M.; Lyakhovitskaya, V.; Margulis, L.; Cohen, H.; Hodes, G.; Hutchison, J. L.; Tenne, R. *J. Am. Chem. Soc.* 1996, 118, 5362.
(16) Rothschild, A.; Frey, G. L.; Homyonfer, M.; Tenne, R.; Rappaport, M. *Mat. Res. Innovat.* 1999, 3, 145.

The mechanism for the synthesis of IF-$MS_2$ (M=Mo, W) from the oxide powder that adequately describes the growth of IF-$WS_2$ from $WO_3$ nanoparticles, as found by the inventors of the present application, was more specifically disclosed in the article:
(17) Feldman, Y.; Lyakhovitskaya, V.; Tenne, R. *J. Am. Chem. Soc.* 1998, 120, 4176.

According to this mechanism, within the first few seconds of a chemical reaction, an encapsulate consisting of a skin of monomolecular $MS_2$ layer or two with a suboxide core, is formed. It was shown that the kinetics of the sulfidization/reduction processes on the surface of the oxide nanoparticles vary strongly with temperature. Only in the temperature range 700-850° C. do the kinetics of the reaction allow sufficiently rapid generation of an absolutely closed spherical sulfide monolayer. This sulfide monolayer averts the fusion of the oxide nanoparticles into micron-size particles and promotes the growth of concentric spherical layers, characterizing fullerene-like structures. Later on, the suboxide core is progressively converted into IF sulfide layers by a slow diffusion-controlled reaction. Consequently, the size and shape of the IF particles are determined by the size and shape of the incipient oxide nanoparticles. It is important to note that the size of the oxide nanoparticles must not exceed 300 nm, otherwise 2H platelets of the respective sulfide are obtained.

$MoS_2$ and $WS_2$ nanotubes were also obtained by chemical vapor transport of the $MS_2$ powder with iodine as a transporting agent, as disclosed in the following articles:

(18) Remskar. M.; Skraba, Z.; Cleton, F.; Sanjines, R.; Levy, F. *Appl. Phys. Lett.* 1996, 69, 351.
(19) Remskar, M.; Skraba, Z.; Regula, M.; Ballif, C.; Sanjines, R.; Levy, F. *Adv. Mater.* 1998, 10, 246.

In an another approach, aquaeous solution of ammounium thiomolybdate was soaked into a porous alumina template. This is disclosed in the article:

(20) Zelenski, C. M.; Dorhout, P. K. *J. Am. Chem. Soc.* 1998, 120, 734.

Subsequent annealing led to the formation of $MoS_2$ nanotubes, which were isolated by dissolving the alumina matrix with KOH solution.

More recently, sonochemical methods have been used for the synthesis of IF structures from various inorganic compounds, including $Tl_2O$. This is known from the following publication:

(21) (a) Mastai, Y.; Homyonfer, M.; Gedanken, A.; Hodes, G. *Adv. Mater.* 1999, 11, 1010; (b) Avivi, S.; Mastai, Y.; Hodes, G.; Gedanken, A. *J. Am. Chem. Soc.* 1999, 121, 4196; (c) Avivi, S., Mastai, Y., Gedanken, A. *J. Am. Chem. Soc.*, 2000, 122, p. 4331.

SUMMARY OF THE INVENTION

There is a need in the art to facilitate the production of inorganic fullerene-like nanostructure by providing a novel chemical method and apparatus therefor.

It was found by the inventors that the previously developed mechanism for the synthesis of IF-$WS_2$ from the oxide powder, cannot be used as is for obtaining molybdenum fullerene-like nanoparticles.

The main concept of the present invention is directed to providing a process for obtaining pure phase of inorganic fullerene-like nanostructures having well defined size. Relatively narrow size distribution of the resulting inorganic fullerene-like nanostructures can be obtained.

The process utilized in the present invention is a chemical process in the gas phase, and is suitable for mass production of inorganic fullerene-like nanostructures. This process is based on reduction of metal oxide in the gas phase.

There is thus provided according to one aspect of the present invention, a process for obtaining inorganic fullerene-like nanostructures, the method comprising the steps of:

(a) evaporating a metal oxide at predetermined temperature conditions;
(b) driving a flow of the evaporated metal oxide towards a reacting zone by means of an inert carrier;
(c) supplying a first reacting agent in the gas phase into the reacting zone, thereby causing an interaction between the evaporated metal oxide and the first reacting agent to convert the evaporated metal oxide into metal suboxide nanoparticles in the gas phase, resulting in condensation of the suboxide nanoparticles; and
(d) supplying at least one second reacting agent in the gas phase into the reacting zone in the path of the condensing metal suboxide nanoparticles, thereby causing an interaction between said at least one second reacting agent and the condensing metal suboxide nanoparticles, and obtaining substantially pure phase of the so-produced inorganic fullerene-like nanoparticles.

The first and second reacting agents interact with the evaporated metal oxide at different subsequent sub-zones of the reacting zone with respect to the direction of flow of the evaporated metal oxide. This is due to different diffusion paths of the first and second reacting agents, which are of different molecular weights, and consequently, one diffuses faster than the other.

In one embodiment of the invention, the first and second reacting agents are provided to the reacting zone with the flow direction opposite to the direction of flow of the evaporated metal oxide, where the evaporated metal oxide first interacts with the first reacting agent. This is achieved either by the fact that the propagation of the first reacting agent is to a larger extent than that of the second reacting agent or by constructing different paths for the first and second reacting gases, where the former is directed into the stream of evaporated metal oxide In step (c), the conversion of the evaporated metal oxide into metal suboxide nanoparticles is done by reduction. Reduction occurs by a chemical reaction of the vaporized metal oxide and hydrogen gas (i.e., the first reacting agent). As a result of the reduction process, the metal suboxide nanoparticles are condensed, since their vapor pressure is lower than that of the metal oxide powder in the vapor phase.

Preferably, the second reacting agent is $H_2S$, the interaction thereby causing sulfidization of the metal suboxide nanoparticles, resulting in the production of the metal sulfide nanoparticles. It should, however, be noted that, generally $H_2Se$, or any other volatile organic sulfur or selenium compound, or mixtures thereof may be used as the second reacting agents.

According to a preferred embodiment of the invention, the metal oxide powder is $MoO_3$. Consequently, reduction results in the formation of $MoO_{3-x}$ clusters. In step (b), the temperature is in the range of from about 710° C. to about 830° C. In step (d), the temperature is about 650-950° C.

The size of the nanoparticles produced by the method of the present invention can generally be in the range of 5-300 nm. It is important to note that the nanoparticles produced with certain selected temperature conditions of the above process are characterized by narrow size distribution, e.g. 5-20 nm.

It should be noted that in order to remove the oxygen from the produced IF nanoparticles precipitating on a ceramic filter, and to introduce sulfur or selenium (or the mixtures thereof, as the case may be), an annealing of the precipitating material is carried out. For this purposes, the precipitating material is further heated to a temperature in the range 850° C.-950° C. for several hours (about 2-4 hours).

According to another aspect of the invention, there is provided an apparatus for obtaining inorganic fullerene-like nanostructures, the apparatus comprising a chemical reactor and temperature control means accommodated outside the chemical reactor and operable to provide predetermined temperature conditions for different zones of the reactor thereinside, wherein the chemical reactor comprises:

(i) a first flow line for passage of a metal oxide powder therethrough towards a reacting zone, the temperature control of the interior of the first flow defining an evaporation zone within the first flow line for evaporating the metal oxide powder on its flow towards the reacting zone (ii) a second flow line for passage of first and second reacting agents towards the reacting zone, where they interact with the evaporated metal oxide, the first and second flow lines being oriented with respect to each other to define predetermined diffusion paths of the first and second reacting agents within said zone of interaction with the evaporated metal oxide to thereby enable obtaining the inorganic fullerene-like nanostructures; and (iii) a collector part for collecting the inorganic fullerene-like nanostructures.

The apparatus comprises one or more inlet for flowing the reacting agents through the second flow line. As for the metal oxide powder, it may either be predominantly kept inside the first flow line prior to commencing its evaporation and flow, or may be flown continuously or discretely through an additional inlet means.

The temperature control means includes heating elements appropriately accommodated in the vicinity of the flow line.

According to a preferred embodiment of the invention, the first and second flow lines are implemented as two concentric tubes. These tubes are preferably mounted one inside the other, the interior of the central tube serving as the first flow line, and the interior of the surrounding tube serving as the second flow line. This construction may be installed inside a third tube, which serves for discharging the reaction gases. The central tube (the first flow line) may be shorter than the second surrounding tube, and the resulting product precipitates at the bottom of the second tube (the second flow line).

According to another embodiment, the first and second flow lines while being implemented as concentric tubes may and may not be arranged as one inside the other, but being just aligned in a spaced-apart parallel relationship. In this case, the first and second reacting agents input the second flow line in a direction opposite to the flow direction of the evaporated metal oxide towards the reacting zone.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

More specifically, the present invention is used with Molybdenum Oxide for production of inorganic fullerene-like (IF) $MoS_2$ nanoparticles, and is therefore described below with respect to this application. Generally, a chemical process of the invention for the synthesis of inorganic fullerene-like $MoS_2$ is based on the above-indicated mechanism as found by the inventors (with respect to $WS_2$). This mechanism consists of three main steps: evaporation of a metal oxide powder, condensation of the oxide vapor to obtain the reduced metal suboxide nanoparticles in the gas phase, and sulfidization of the reduced metal suboxide nanoparticles.

Although there are many common features in the synthesis of the IF phase of $MoS_2$ and $WS_2$, they differ in some important details. $MoO_3$ powder evaporates at temperatures above 700° C., while $WO_3$ does not sublime below 1400° C. Therefore, at the prevailing reaction temperatures (around 850° C.), the sulfidization of $MoO_3$ and $WO_3$ powders occur by the gas-phase and solid-gas reactions, respectively.

The above actually means that, in order to obtain pure phase and desired size (preferably narrow size distribution) of the IF nanoparticles of a specific metal, appropriate temperature and other chemical process conditions should be selected to meet the requirements of the specific resulting product production.

For example, with respect to the synthesis of IF-$WS_2$, prior to this process, the precursor- oxide-nanoparticles of a desirable size and shape must be prepared. In the case of IF-$MoS_2$, as will be described more specifically further below, partial reduction of the trioxide molecular clusters leads to their condensation to form suboxide nanoparticles, which serve as an intermediate in the IF-$MoS_2$ synthesis. The process requires a precise control over the reaction products (yield and size) and reproducible synthesis of these nanoparticles. This step is a prerequisite for a scale-up of the IF-$MoS_2$ phase synthesis.

Figure 1A:
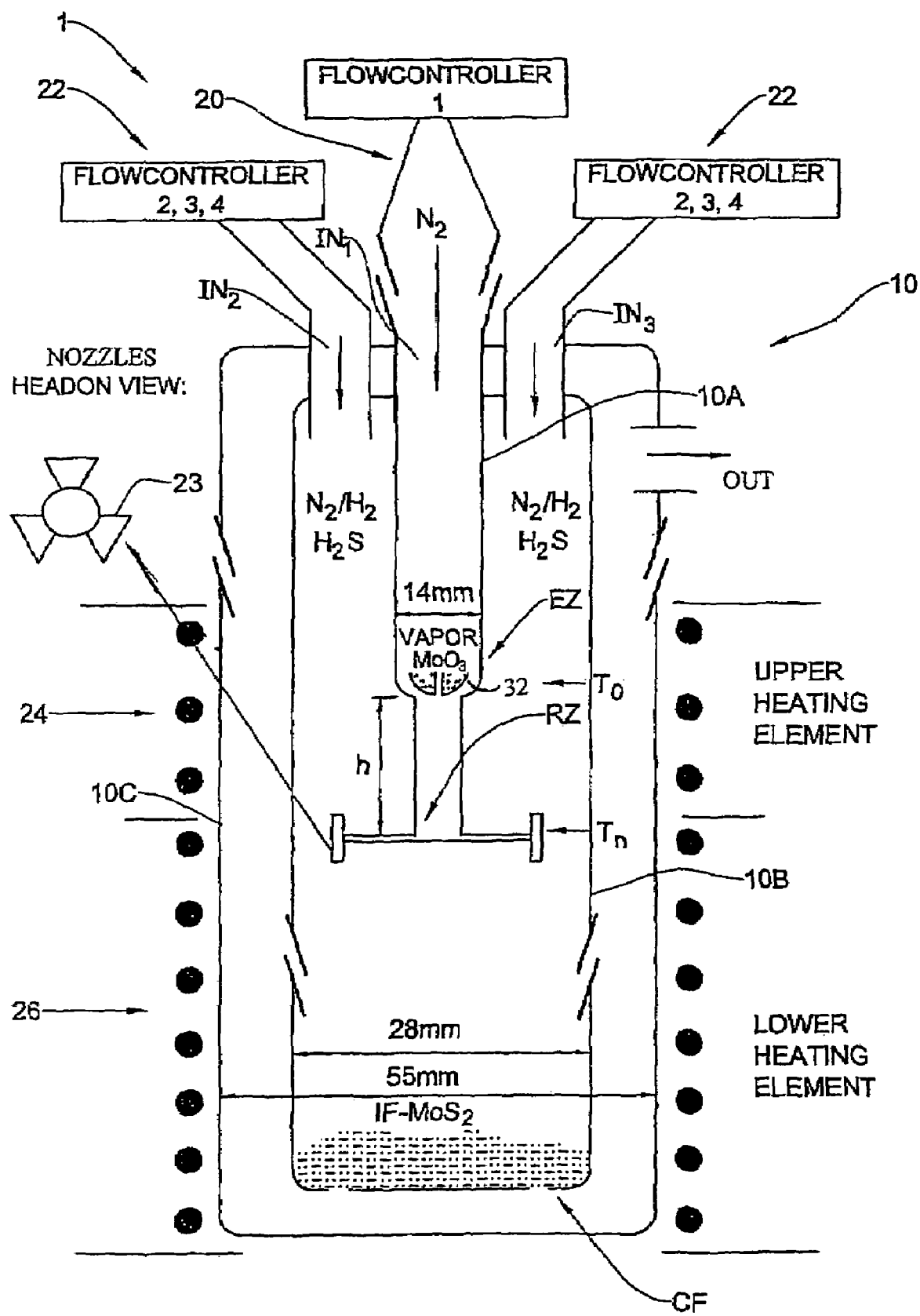
FIG. 1A is a schematic illustration of a chemical reactor according to one embodiment of the invention.

Referring to FIG. 1A, there is illustrated an apparatus 1 used for production of IF-$MoS_2$ nanostructure. The apparatus comprises of a chemical reactor 10 that consists of three concentric quartz tubes: an inner (central) tube 10a (constituting a first flow line), an intermediate tube 10b (constituting a second flow line) and an external tube 10c. A reacting zone RZ starts inside the inner tube 10a at its distal end and extends towards a bottom part of the reactor, where the resulting product is collected (precipitates) on a ceramic filter CF. $MoO_3$ powder is maintained in the tube 10a within an evaporation zone EZ above the reacting zone RZ. The reactor 10 is associated with three vessels (not shown) containing, respectively, $N_2$ (constituting an inert carrier), $H_2$ (constituting a first reacting agent) and $H_2S$ (constituting a second reacting agent). These materials are sequentially fed to the reactor 10 through flow controllers 20 and 22. The controller 20 controls the flow of $N_2$ towards the evaporation and reaction zones EZ and RZ through the inner tube 10a, and the controller 22 controls the flows of $N_2$, $H_2$ and $H_2S$ towards the reacting zone RZ through the intermediate tube 10b. To this end, the reactor 10 is formed with three inlet opening $IN_1$, $IN_2$ and $IN_3$ for supplying the $N_2$, $H_2$ and $H_2S$. It should be noted, although not specifically shown, that an additional inlet may be provided in the reactor 10 for supplying additional amount of $MoO_3$ powder in a continuous flow or by discrete portions thereof. The connection between the interiors of the central and intermediate tubes 10a and 10b is carried out by means of three nozzles, generally at 23. Also formed in the reactor at its upper part is an outlet opening OUT for discharging the reaction gases. The geometry of the flow lines inside the reactor 10 is shown in the figure in a self-explanatory manner.

Further provided in the apparatus 1 are heating elements—upper and lower heating elements 24 and 26 (constituting a temperature control means) accommodated outside the reactor 10. The heating elements are operated to provide required temperature conditions of the entire process. More specifically, the upper element 24 serves for maintaining the temperature conditions required for the evaporation of the metal oxide, while the lower element 26 serves for providing and maintaining the temperature condition required for the chemical reactions. Practically, the three-tube quartz reactor was installed inside a tube like oven (i.e., two heating elements). The temperature profile of the oven was accurately determined with a precision of ±1° C. along the designed quartz reactor. A small bucket 32 is accommodated in the tube 10a for the $MoO_3$ powder (in the amount of 1 g in the present example) to be placed therein. The height and size of the bucket 32 were varied until an optimal configuration was obtained.

In the present example of FIG. 1A, the mutual orientation and dimensions of the flow lines 10a and 10b enable initial flow of the first and second reacting agents into the flow line 10b in the same direction as the flow of the metal oxide towards the reaction zone RZ.

Following is the description of an example of using the apparatus 1 (with the flow lines' dimensions as shown in FIG. 1A) to obtain IF nanoparticles.

EXAMPLE 1

In the present example, typically 1 g of $MoO_3$ powder was placed in the bucket 32 where the amount of the evaporated powder in each experiment is in the range of 100-150 mg. Such a portion does not influence appreciably the level of the oxide in the bucket. Therefore, the rate of the oxide evaporation from the bucket was time-independent. For a long experiment (that lasts more than 4 hours), the temperature $T_0$ of the bucket 32 as to be increased during the experiment in order to keep the evaporation rate constant.

The flow rate of $N_2$ ($J_{N2}$) in the inner tube 10a (i.e., to drive the evaporated metal oxide towards the reacting zone) was controlled by the flow controller 20 (FIG. 1A). The flow of the other gases ($H_2S$, forming gas $H_2/N_2$ and $N_2$) needed for the reactions to occur in the reacting zone RZ were provided by the flow controllers 22. The forming gas was supplied with different flow rates $J_{FG}$ and volume percents $C_{H2}$ of hydrogen ($C_{H2}$ =1÷8). The $H_2S$ concentration ($C_{H2S}$) was varied from 1% to 4%. Finer control of the $H_2$ concentration was achieved by dilution of the forming gas with $N_2$. Manometers were appropriately installed in the flow lines for determining and controlling the gas pressures. A significant increase in the gas pressure downstream of the flow controller 20 was indicative of the obstruction of nozzles 23 by the reaction product.

The oxide evaporation temperature $T_0$ was varied from 710° C. to 810° C., keeping the nozzles' temperature $T_n$ (where the sulfidization process starts) almost constant (800° C.±10° C.). The product was collected on the ceramic filter CF with tortuous paths. Typically, about 150 mg of $MoO_3$ powder was sublimed, from which 50-70 mg of $IF-MoS_2$ were obtained as a single and isolated (pure) phase during 5-6 hours. The rest of the metal material was transformed into various phases, which were deposited on the quartz substrate 30 (not shown) inside the tube 10a. The quartz substrate 30 was placed inside the tube 10a so as to extend along the distal end of the tube. Hence, the reaction products, during their flow towards the bottom part of the reactor, adhere to the surface of the quartz substrate and can be analyzed. It should be understood that the quartz substrate 30 serves for the experimental purposes only, and is not a part of the chemical reactor, and the above parameters present one specific example only.

The reaction products were analyzed by X-ray powder diffractometer model Rigaku Rotaflex RU-200B with $CuK_\alpha$ anode (1.54178A), transmission electron microscope Philips model CM-120, and scanning electron microscope JEOL 6400, equipped with energy dispersion spectrometer Link model ISIS. Samples for transmission electron microscopy (TEM) analysis were prepared by suspending the powder in ethanol, using ultrasonic bath, and subsequent dripping of the suspension on the grid and drying. The size of the nanoparticles was determined by TEM analysis, based on statistics over a few hundreds nanoparticles for each sample.

The following is the description of a model capable of explaining the growth mechanism for fullerene-like $MoS_2$ nanoparticles in the gas phase underlying the method of the present invention:

The first step in the synthesis of $IF-MoS_2$ is the evaporation of $MoO_3$. The vapor phase of $MoO_3$ consists predominantly of the molecular clusters: $Mo_3O_9$, $Mo_4O_{12}$ and $Mo_5O_{15}$. The cluster $Mo_3O_9$, which has a hexagonal ring structure, is the most stable one, and, consequently, it is the most volatile cluster of the three. In the next step, these clusters condense into larger oxide nanoparticles.

According to the prior art IF growth mechanism (developed by the inventors of the present invention), oxide nanoparticles 5-300 nm in size are necessary as a precursor for the synthesis of $IF-MoS_2$.

In the present process the temperature increases from step to step, having a positive gradient along the molecular clusters flow. Therefore, the classical method for nanoparticles synthesis by cooling and condensation of the vapor phase could not be invoked to explain the current growth mechanism. However, condensation can be provoked also by a chemical reaction, in which case the vapor pressure of the product is lower than that of the precursor in the vapor-phase. This mechanism explains the formation of oxide nanoparticles from the $(MoO_3)_3$ clusters in the invented method.

A gas phase reaction of diffused hydrogen with $Mo_3O_9$ molecular clusters leads to their reduction into molybdenum suboxide. Being non-volatile at the present working temperatures, the reduced clusters condense into suboxide nanoparticles, $MoO_{3-x}$. Once the condensation step is completed, i.e., nanoparticles of 5-300 nm in size have been obtained; they are allowed to encounter H$_2$S and the conversion into fullerene-like MoS$_2$ nanoparticles commences.

Figure 1B:
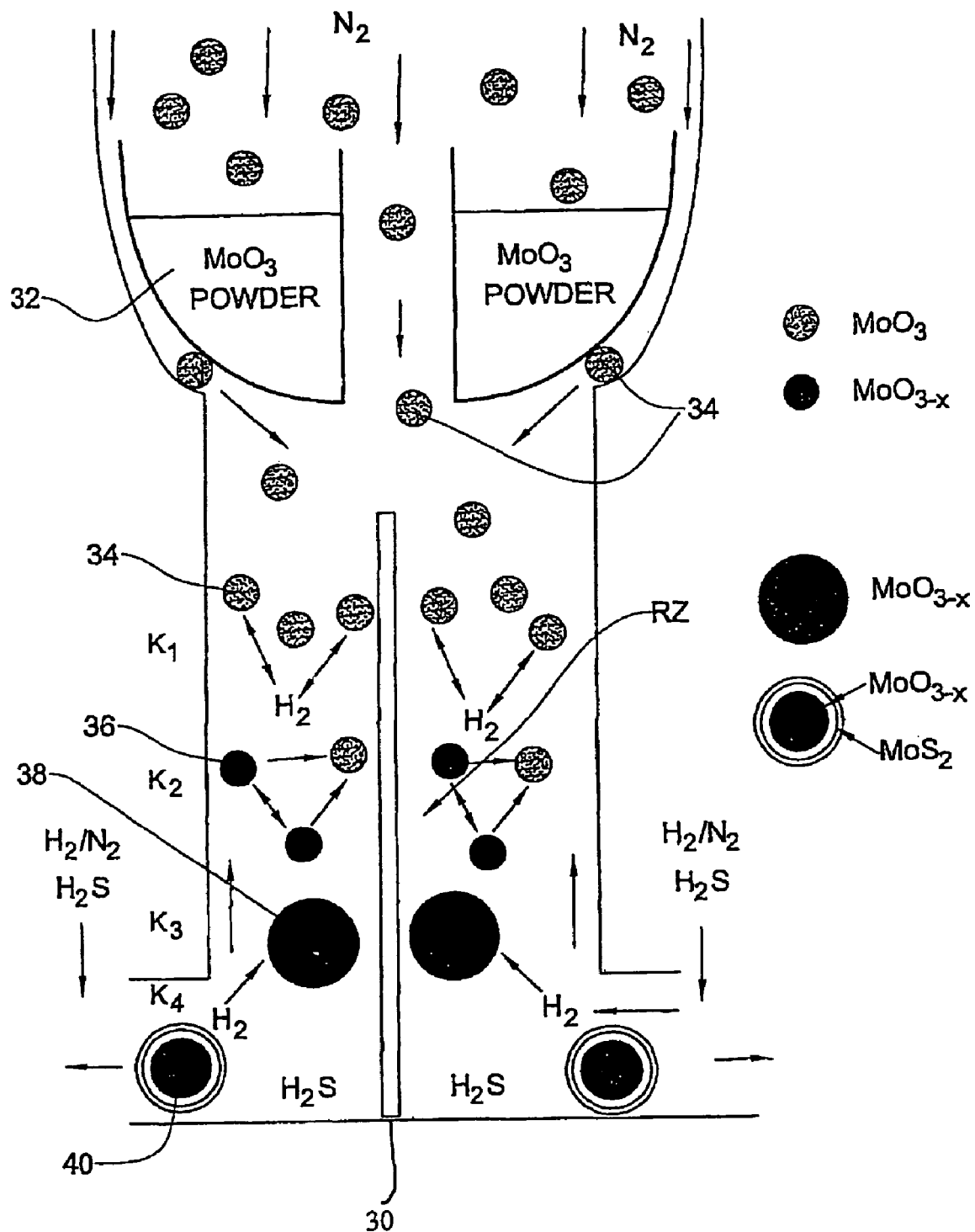
FIG. 1B more specifically illustrates the main flow line of the reactor of FIG. 1A.

Reference is now made to FIG. 1B which more specifically illustrates the reactions that take place in the reactor 10, with reference thus also being made to FIG. 1A, as just described. When the upper heating element 24 is activated to heat the MoO$_3$ (i.e., to evaporate the metal oxide), the flow of N$_2$ is directed towards the bucket 32 through the inlet opening IN$_1$. As a result, the evaporated metal oxide (molecular clusters), generally at 34, are caused to flow towards the reacting zone RZ along the distal end of the center tube 10$a$. The reacting zone is actually divided into four sub-zones K$_1$, K$_2$, K$_3$ and K$_4$.

The molecules of the first and second reacting agents (H$_2$ and H$_2$S) are brought to the nozzles 23 by the inert carrier N$_2$ through the flow line defined by the tube 10$b$. As a result of appropriate pressure provided by the flow rate of these gases towards the nozzles, they diffuse into the tube 10$a$ through the nozzles opening, thereby interacting with the molecular clusters 34. It should be understood that, because the H$_2$ molecules of are much lighter than those of H$_2$S, they diffuse quicker, and therefore, the interaction between the evaporated molecular clusters 34 and the H$_2$ molecules occurs prior to the interaction with the molecules of H$_2$S. The H$_2$S actually react with components resulting from the reaction between the evaporated molecular clusters 34 and H$_2$, i.e., the reduced metal oxide, or metal suboxide, MoO$_{3-x}$, generally at 36. The latter condense causing the formation of nanosize clusters thereof 38. The condensation occurs as a result of the fact that at the evaporating temperature of MoO$_3$, its suboxide condenses.

Thus, the molecules of H$_2$S interact with the nanosize clusters 38, resulting in the formation of surface layers 40 (sulfide layers MoS$_2$ in the present example) on the clusters 38. As this reaction proceeds, further layers 42 of MoS$_2$ are formed. As the so-produced particles are heavier, they propagate towards the bottom part of the tube 10$b$, and the reaction proceeds during this propagation, and thereafter. By this, the desired size of the so-produced IF nanoparticles is obtained.

In order to obtain the desired particles' size, it may be needed to remove the oxygen from the produced IF nanoparticles precipitating on the ceramic filter CF, and to introduce sulfur. To this end, the precipitating material is further heated to a temperature ranging between 850° C. and 950° C. for several hours (about 2-4 hours). This can be implemented by halting the supply of the reaction materials, and lifting the reactor such that the bucket 32 is located outside the zone being heated, and only the vicinity of the ceramic filter is surrounded by the heating element.

It is important to note that, although in the present example H$_2$S is used as the second reacting agent, any other volatile organic sulfur or selenium compound may be used, as well as the mixtures thereof.

Thus, the reduction reaction of the vapor oxide (molecular clusters 34) with hydrogen takes place in the sub-zone K$_1$, can be described as follows:

$$(MoO_3)_3 + mH_2 \xrightarrow{k_1} (MoO_{3-m/3})_3 + mH_2O \tag{1}$$

wherein m=1,2,3, . . . ,9 depends on the relative concentrations of (MoO$_3$)$_3$ and H$_2$.

The coalescence of non-volatile suboxide molecular clusters with trioxide molecular clusters is a multi-step process, which results in the formation of suboxide nanoparticles in the sub-zone K$_2$. This multiple step reaction can be schematically represented through an apparent single step of condensation:

$$p(MoO_3)_3 + s(MoO_{3-m/3})_3 \xrightarrow{k_2} (MoO_{3-x})_n \tag{2}$$

wherein n=3p+3s are integers and x=s*m/n.

The reduction process is being continued in sub-zone K$_3$ while hydrogen encounters suboxide nanoparticles, which have been formed in reactions 1+2.

$$(MoO_{3-x})_n + H_2 \xrightarrow{k_3} (MoO_{3-x-1/n})_n + H_2O \tag{3}$$

The rate of reduction is proportional to the specific surface area of the nanoparticles. The reduction rate of molybdenum oxide powder decreases substantially as a result of aggregation of the nanoparticles (K$_1$>>k$_3$). Therefore, the condensation of the molecular clusters (MoO$_3$)$_3$ into nanosize particles (MoO$_{3-x}$)$_n$ inhibits their fast reduction process.

The condensed oxide nanoparticles flow to the sulfur diffusion volume, i.e., close to nozzles 23 within the sub-zone K$_4$. At this point, synthesis of IF-MoS$_2$ commences. The suboxide nanoparticles surrounded by a few sulfide shells (IF), flow to the ceramic filter CF (FIG. 1A), where they are collected and continue to sulfidize. Complete conversion of the oxide nanoparticles affords hollow IF-MoS$_2$ after a few hours reaction:

$$(MoO_{3-x})_n + 2nH_2S + (1-x)nH_2 \xrightarrow{k_4} (MoS_2)_n + (3-x)nH_2O \tag{4}$$

Figure 2:
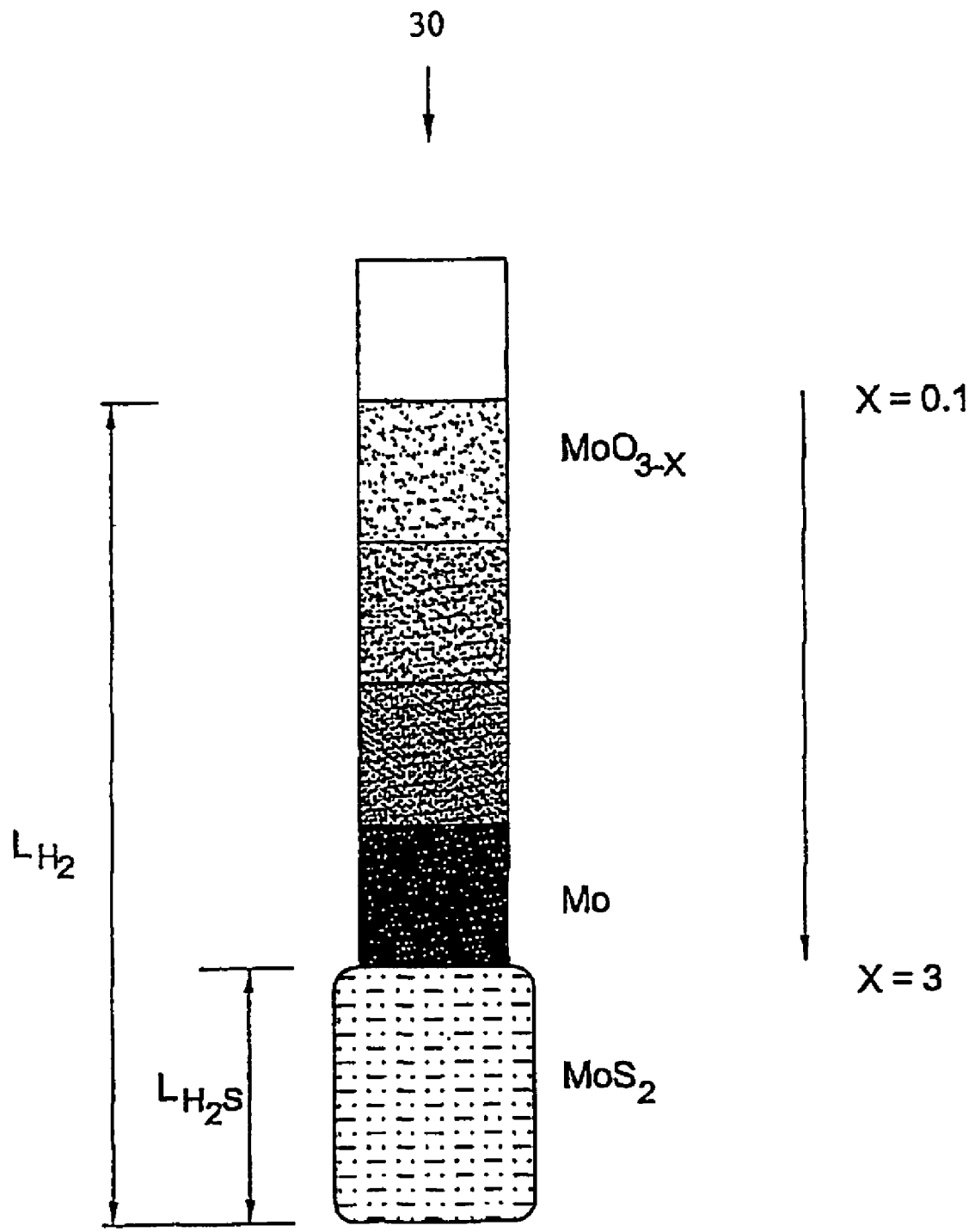
FIG. 2 schematically illustrates the components' distribution within the reacting zone of the flow line of FIG. 1B.

In order to elaborate the growth mechanism of the nanoparticles, the reaction intermediates are probed due to their precipitation in different colors (indicative of the oxide intermediates) onto the quartz substrate (rod) 30. Different reduced phases of molybdenum oxide (MoO$_{3-x}$, MoO$_2$ and even metallic Mo), as well as molybdenum sulfide, were observed as a separate phases on the rod. This is illustrated in FIG. 2. The following components are adhered onto the successive locations of the rod (with respect to the direction of flow of the metal oxide towards the reacting zone): different oxidation states of molybdenum oxide between MoO$_{3-x}$ and Mo (x varying between 0.1 and 3), and the resulting product MoS$_2$. The length of the rod part defined by the adherence of MoS$_2$ presents the H$_2$S diffusion length (L$_{H2S}$). The length of the rod part defined by the adherence of all the above components present the H$_2$ diffusion length (L$_{H2}$).

The above observations are indicative of the following mechanism, based on the known fact that molybdenum oxide is known to exist in many reduced phases MoO$_{3-x}$ with 0<x<1. As described above in FIG. 1B in the present reaction the reduction and sulfidization reactions of the oxide nanoparticles occur already in the central tube 10$a$. This means that both hydrogen and H$_2$S gasses diffuse from the intermediate tube 10b into the central tube 10a against the nitrogen gas flow pressure.

After evaporation, the MoO$_3$ vapors are heated-up and carried towards the nozzles 23 inside the tube 10a by the N$_2$ flow (with the appropriate flow rate J$_{N2}$). Along this path, the MoO$_3$ clusters are reduced by hydrogen, and they partially precipitate on the upper part of the quartz rod 30. Energy dispersion spectrometry (EDS) analysis of the precipitated components indicates that the degree of reduction of the molybdenum oxide increases towards the lower part of the tube 10a, close to the nozzles 23, where the hydrogen concentration is higher. The reaction of MoO$_{3-x}$ with the H$_2$S gas diffusing from 10b to 10a leads to the formation of MoS$_2$ and its deposition on the lower part of the rod 30. The spatial separation (within the reactor height) between the reduction and sulfidization reactions is mainly attributed to the difference in the diffusion length of hydrogen (L$_{H2}$) and the diffusion length of H$_2$S (L$_{H2S}$) due to the difference in the diffusion coefficients of the two gases. The diffusion coefficient D is determined as follows: $D \propto 1/(M)^{1/2}$, wherein M is the molecular weight of the gas (M$_{H2S}$=34; M$_{H2}$=2).

When strong hydrogen diffusion occurred (i.e., the H$_2$ diffusion length L$_{H2}$ is higher than the bucket height h), the MoO$_3$ powder inside the bucket was reduced. On the other hand, no reduction of oxide powder inside the bucket was found when the precipitation height of the suboxide was a few millimeters below the bucket height (i.e., L$_{H2}$<h). Therefore, the diffusion lengths L$_{H2}$ and L$_{H2S}$ were determined by the precipitation height of the suboxide and the sulfide, respectively, on the quartz rod 30. The difference in these two parameters (L$_{H2}$-L$_{H2S}$) characterizes the spatial separation between the reduction and sulfidization reactions of the MoO$_3$ vapor and is referred to as the "reduction volume" or "reduction path".

The above model described with respect to FIG. 1B and elaborated by the analysis of the precipitated components on the quartz rod 30 reveal that in this process the stoichiometry of the oxide precursor, synthesized in the vapor phase, is determined by the reduction and condensation reactions. Therefore, the stoichiometry of the suboxide nanoparticles depends on the relationship between the hydrogen flux (J$_{H2}$) and the flux of MoO$_3$ (J$_{MoO3}$). It is found that molybdenum based fullerene-like nanoparticles are obtained when the following condition is satisfied: J$_{H2}$/J$_{MoO3}$<1.

The hydrogen stream J$_{H2}$ from the intermediate tube 10b to the tube 10a is determined by a diffusion, and consequently, obeys the one-dimensional Fick's laws of diffusion:

$$j_{H2}(x,t) = -D_{H2} * \delta C_{H2}(x,t)/\delta x. \quad (5)$$

Since H$_2$ is provided to the reaction zone by diffusion, and is consumed by first-order chemical reactions (Eqs.1 and 3 above), the second order Fick's equation reads:

$$\delta C_{H2}(t,x)/\delta t = D_{H2} * \delta^2 C_{H2}(t,x)/\delta x^2 - k * C_{H2}(t,x) \quad (6)$$

wherein j$_{H2}$(x,t) [mole/sec/cm$^2$] is the flux density of the hydrogen stream; C$_{H2}$(x,t) [mole/cm$^3$] is the H$_2$ concentration at a given location x at time t; D$_{H2}$ [cm$^2$/sec] is the diffusion coefficient of hydrogen; k=K$_1$+k$_3$ and kC$_{H2}$(t,x) is the rate of the chemical reaction for H$_2$.

The two counteracting processes: diffusion of H$_2$ into the reaction zone in the tube 10a and its runoff by means of a chemical reaction with MoO$_3$, establish a steady state ($\delta C_{H2}(t,x)/\delta t=0$) of non-uniform (decreasing) H$_2$ concentration along the hydrogen diffusion path L$_{H2}$. Such a time independent process can be described as:

$$D_{H2} * \delta^2 C_{H2}(x)/\delta x^2 - k * C_{H2}(x) = 0 \quad (7)$$

The solution for this equation, with the boundary conditions C$_{H2}$(x=0)=C$_{H2}^\circ$ and C$_{H2}$(x=L$_{H2}$)=0, yields the concentration profile of H$_2$:

$$C_{H2}(x) = 1.2 C_{H2}^\circ * \exp[-x*(k/D_{H2})^{1/2}] - 0.2 C_{H2}^\circ * \exp[x*(k/D_{H2})^{1/2}] \quad (8)$$

It should be noted that C$_{H2}^\circ$ is the H$_2$ concentration near the nozzles (23 in FIG. 1A). As will be shown below, C$_{H2}^\circ$ is differed from the initial H$_2$ concentration in the forming gas (C$_{H2}^{FG}$).

Substituting L$_{H2}$=(D$_{H2}$/k)$^{1/2}$ and the above equation 8 into the equation 5, the hydrogen flux is obtained:

$$J_{H2} = C_{H2}^\circ * D_{H2}/L_{H2}(1.2\exp[-x/L_{H2}] + 0.2(\exp[x/L_{H2}]) \quad (9)$$

In the following, JH$_2$ at the entrance to the nozzles 23, i.e., at x=0 is calculated and compared to J$_{MoO3}$. L$_{H2}$ is determined experimentally, as described above and is 2.4 cm for 5% H$_2$ (in the forming gas). The value of D$_{H2}$ at the temperature of 0° C. is tabulated and is as follows: D$_{H2}$(0° C.)=0.688 cm$^2$/sec. The following relationship was used to calculate the value of D$_{H2}$ at a given T$_n$:

$$D_{H2} = D_{H2}(0° C.) \times ((T_n+273)/(273))^{1.7} \quad (10)$$

from which the value 6.7 cm$^2$/sec was obtained for D$_{H2}$ at T$_n$=800° C.

Assuming the validity of the ideal gas relationship, C$_{H2}^{FG}$ at the reactor temperature (T$_n$) is:

$$C_{H2}^{FG}(T_n) = C_{H2}^{FG}(0° C.) \times (273)/(T_n+273) \quad (11)$$

from which the value 5.6*10$^{-7}$ mole/cm$^3$ was obtained for C$_{H2}^{FG}$ at T$_n$=800° C. and 5% hydrogen (volume percent in the forming gas). Taking into account the cross-sectional area of the three nozzles (S$_n$=0.08 cm$^2$), through which the diffusion occurs, the H$_2$ stream is calculated to be:

$$J_{H2} = S_n * j_{H2} \quad (12)$$

The variation of the temperature of the nozzles (T$_n$) with the oxide evaporation temperature (T$_0$) is rather modest. Therefore, to a first approximation the diffusion flux of hydrogen from the intermediate tube 10b to the central tube 10a is independent on the temperature T$_0$.

Various experimental parameters affecting the reaction product were controlled in every experiment. These parameters include inter alia the following parameters: nozzles' temperature (T$_n$), oxide evaporation temperature (T$_0$), H$_2$ concentration (C$_{H2}$), concentration of H$_2$S (C$_{H2S}$), N$_2$ flow rate (J$_{N2}$), forming gas flow rate (J$_{FG}$), nozzles cross-section area (S$_n$), and bucket height (h). These are the important parameters defining the mechanism of formation of IF-MoS$_2$. The following is the description presenting the effect of each of these parameters (which was optimized by varying its value, while keeping the values of the other parameters constant) on the reaction products.

Figure 3A:
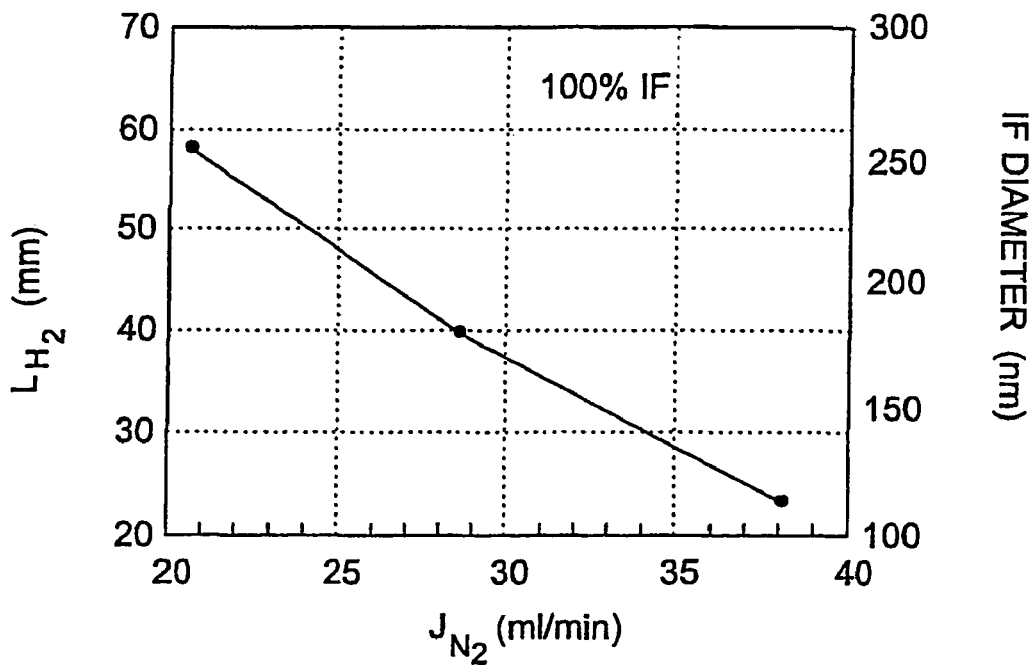
FIG. 3A graphically illustrates the experimental results showing the effects of the flow rate of the first reacting agent on the diffusion length and IF size.
Figure 3B:
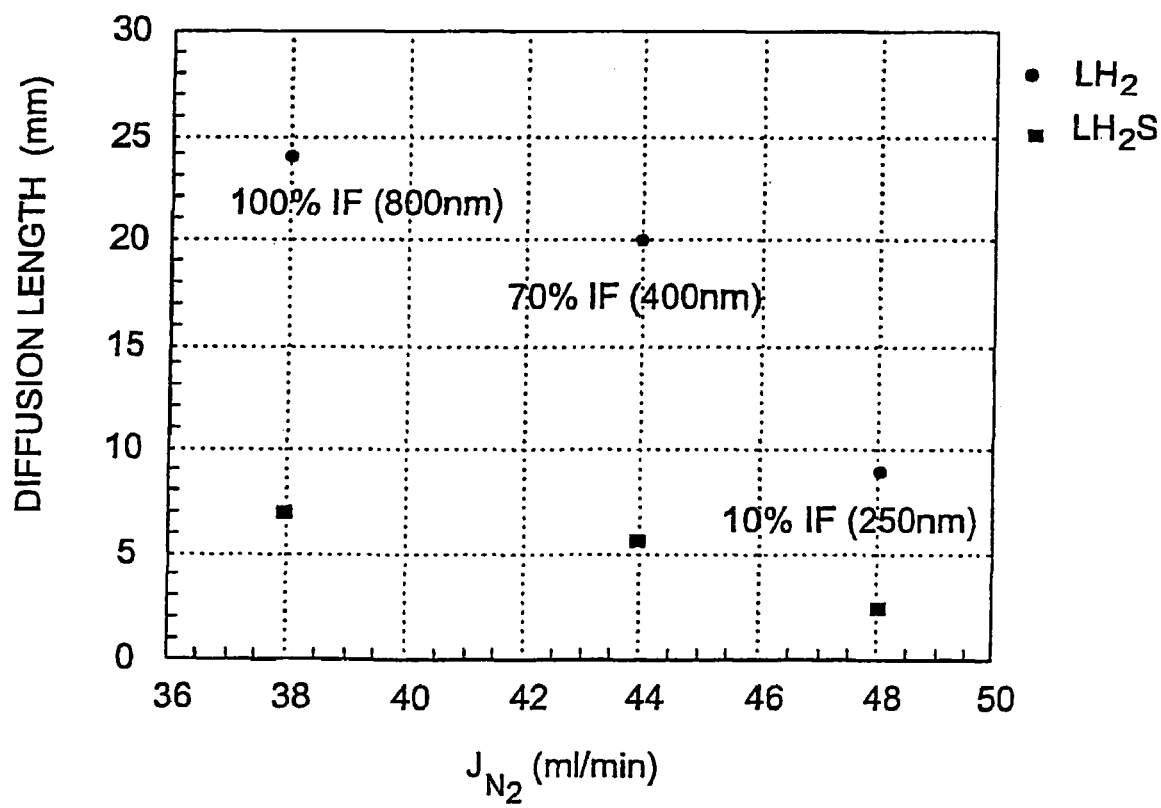
FIG. 3B graphically illustrates the experimental results showing the effects of the flow rates of the first and second reacting agents on the diffusion length and IF size.

Referring to FIGS. 3A and 3B, there are graphically illustrated the relationship between the diffusion lengths L$_{H2}$ and L$_{H2S}$, and the MoO$_3$ vapor stream (J$_{MoO3}$) on the one hand, and parameters of IF-MoS$_2$ production (yield and size), on the other hand, as a function of the main experimental parameters.

FIGS. 3A and 3B show the effect of N$_2$ gas flow rate (J$_{N2}$) on the diffusion lengths and IF size at different temperature conditions and the flow rate values. The hydrogen diffusion length L$_{H2}$ could be varied from a few millimeters (from the nozzles 23) to about 90 mm, which is the height of the bucket (h). The parameter that influenced L$_{H2}$ (and L$_{H2S}$) mostly was the N$_2$ flow rate J$_{N2}$. Increasing the J$_{N2}$ led to the decrease of L$_{H2}$ (and L$_{H2S}$), and to a decrease of the IF nanoparticle sizes.

When $J_{N2}$ is very large (48 ml/min), the hydrogen diffusion length- $L_{H2}$ is rather small. Consequently the reduction volume, as expressed by the reaction path $\Delta L=L_{H2}-L_{H2S}$ is rather small (<6 mm). The small value of $\Delta L$ does not permit a sufficient reduction of the oxide and condensation of the suboxide nanoparticles. Therefore, the amount of IF nanoparticles produced under these conditions is rather small (10%) and increases as $J_{N2}$ decreases (see FIG. 3B). A pure IF phase is obtained when $\Delta L$ is larger than 17 mm. As $\Delta L$ increases ($J_{N2}$ decreases), the size of the IF nanoparticles increases. A larger reduction path allows for the reduced oxide clusters to encounter the suboxide nanoparticles for longer period of time and thereby to grow in size. These figures display yet another phenomenon. At a lower temperature ($T_0=765°$ C.) and higher values of the $N_2$ flow rate $J_{N2}$, increasing the $J_{N2}$ leads to a decrease in the fraction of IF-phase in the product (FIG. 3B). At a higher temperature ($T_0=785°$ C.) and small values of $J_{N2}$ the yield of the IF-phase remain unchanged (100%), as shown in FIG. 3A. When $L_{H2}$ was below 10 mm, mostly 2H-$MoS_2$ platelets were obtained. The values of $J_{N2}$ had negligible influence on the evaporation rate of the $MoO_3$ powder under the present experimental circumstances.

The effect of the nozzle cross-section area ($S_n$) on the $H_2$ diffusion length ($L_{H2}$) can be attributed to several factors: First, according to the diffusion (Fick) law, the diffusion fluxes of hydrogen and $H_2S$ (i.e., $J_{H2}$ and $J_{H2S}$) are linearly proportional to the cross-section area of the opening (nozzles). Second, the hydrodynamic regime of the reactor defines two counter-propagating fluxes ($J_{N2}$ and $J_{FG}$) towards each other at the nozzle's 23. It was found that the increase of the nozzle cross-section area by a factor of 2, leads to the increase of the $H_2$ diffusion length $L_{H2}$ from 10 mn to 23 mm. Nevertheless, a simple relationship between $S_n$ and IF-formation was not observed, since variation in this parameter influenced many of the other experimental parameters in a non-trivial way.

Another important effect is related to the inadvertent precipitation of reduced $MoO_2$ in the nozzles 23, which tends to clog them and thereby disturb the reaction parameters. Careful matching of $S_n$ to the kinetics of the reaction and the fluxes averted this undesirable phenomenon.

Figure 4:
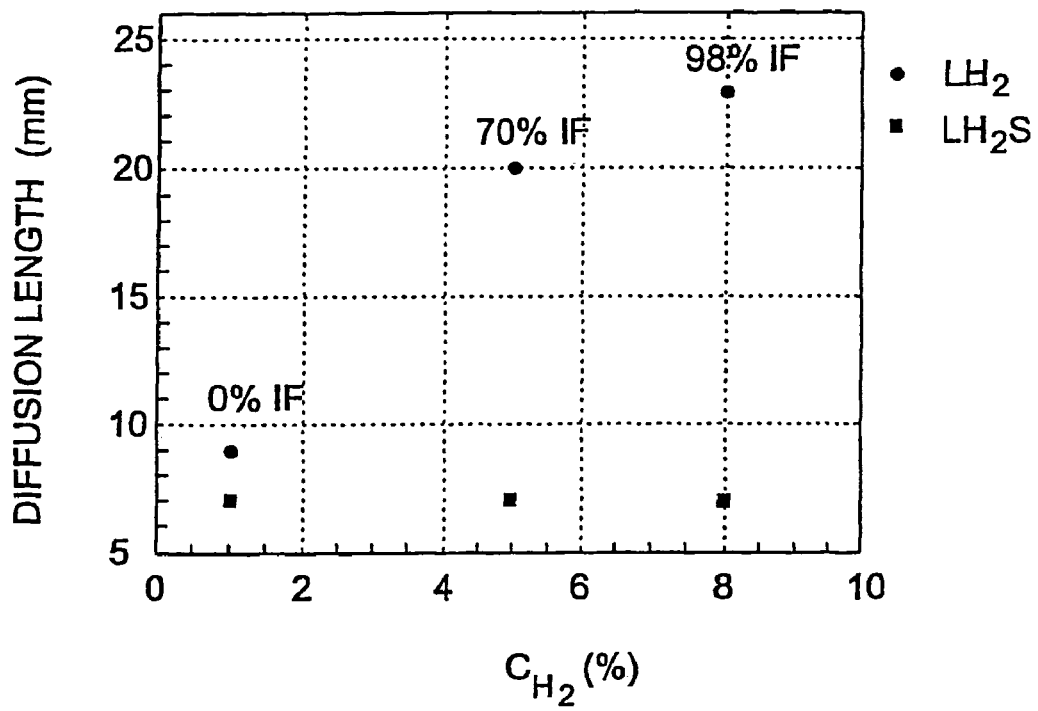
FIG. 4 illustrates the experimental results showing the effect of the concentration of the first reacting agent on the diffusion length and IF yield.

As for the hydrogen concentration ($C_{H2}$) in the forming gas, the increase thereof leads to the increase of the diffusion lengths $L_{H2}$, while the diffusion length $L_{H2S}$ remained unchanged. This is illustrated in FIG. 4. According to the diffusion (Fick) law, the diffusion flux (i.e., $J_{H2}$ and $J_{H2S}$) is linearly proportional to the concentration gradient. The relationship between $C_{H2}$ and the fraction of IF-phase in the product was, however, found to be much more complicated. Under the specific conditions of the present series of experiments ($T_0=765°$ C., $J_{N2}=44$ ml/min), the increase of the hydrogen gas concentration led to the increase of the fraction of IF nanoparticles in the product. However, at lower temperatures ($T_0<720°$ C.), the fraction of IF nanoparticles in the product decreased with increasing $C_{H2}$, as will be described further below.

Figure 5:
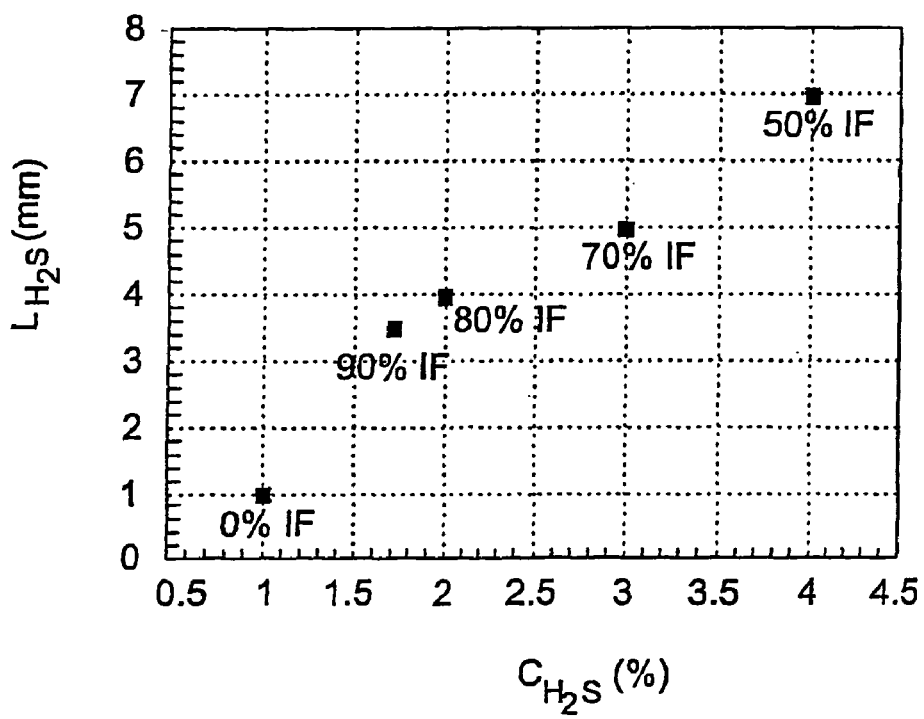
FIG. 5 illustrates the experimental results showing the effect of the concentration of the second reacting agent on the diffusion length and IF yield.

Turning now to FIG. 5, there are shown results of a few experiments carried-out in low $H_2S$ concentrations (as compared to 4% $H_2S$ concentration used in the most of the experiments). This presents the effect of $H_2S$ concentration ($C_{H2S}$) on the diffusion length of the gas (as determined from the height of the sulfide deposits on the quartz rod). As expected from Fick's law, a simple monotonic dependence is observed. The influence of $C_{H2S}$ became perceptible at small $J_{MoO3}$, when $L_{H2}$ is low. Thus, the effect of $C_{H2S}$ was studied under low temperature $T_o=725C$., nitrogen flux (38 ml/min) and $C_{H2}=5\%$. At such a low temperatures ($T_0=725°$ C.), the fraction of IF-$MoS_2$ increases first, and then decreases as the concentration of $H_2S$ is increased. Decreasing of $C_{H2S}$ from 4% to 1.7% leads to a decrease in $L_{H2S}$ (from 7 mm to 3.5 mm), while $L_{H2}$ remains unchanged (12 mm). Consequently the reduction volume ($L_{H2}-L_{H2S}$) and the IF yield increased (from 5 to 8.5 mm and from 50% to 90%, respectively). An additional decline of $C_{H2S}$ to 1% resulted in a depletion of $H_2S$ in tube 10a and the disappearance of IF in the product. It was shown that the kinetics of the sulfidization/reduction processes on the surface of the oxide nanoparticles varies strongly with $H_2S$ concentration. When the $H_2S$ concentration is above a threshold value, the kinetics of the reaction allows sufficiently rapid generation of an absolutely closed spherical sulfide monolayer on the oxide surface. This sulfide monolayer averts the fusion of the oxide nanoparticles into micron-size particles and promotes the growth of concentric spherical layers, characterizing fullerene-like structures. Contrarily, for 1% $C_{H2S}$ the kinetics of the sulfidization reaction is too slow, and, consequently, 2H platelets are obtained.

Figure 6:
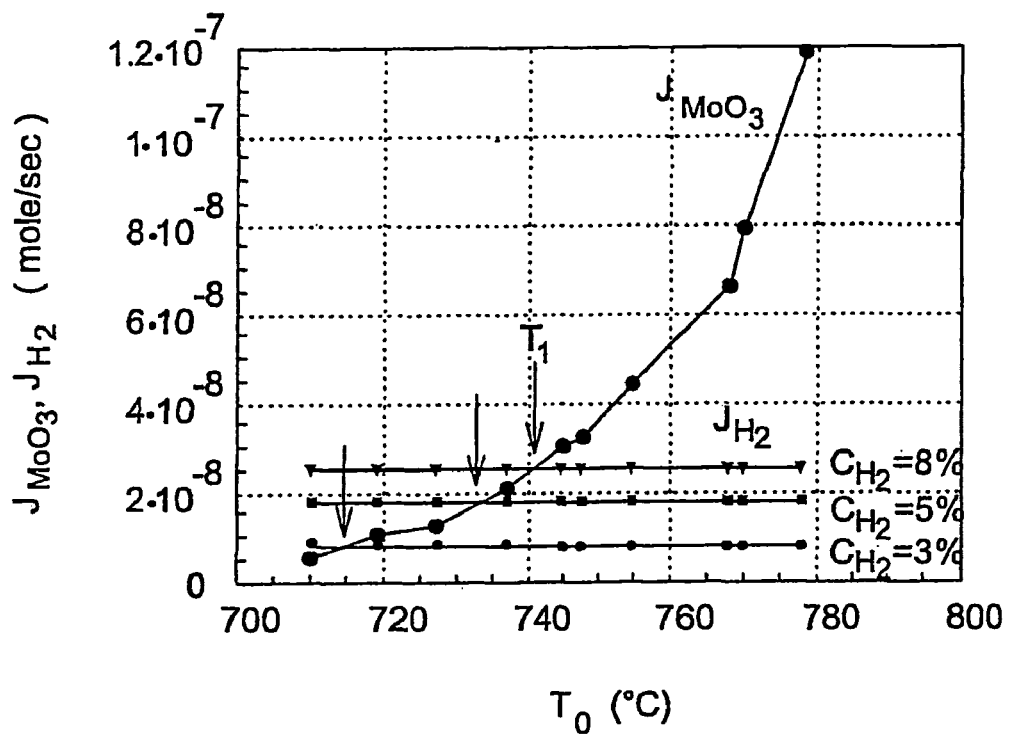
FIG. 6 illustrates the experimental results showing the evaporation rate of Molybdenum oxide as a function of the temperature.

Turning now to FIG. 6, the influence of the oxide evaporation temperature $T_o$ on the $MoO_3$ and $H_2$ fluxes is demonstrated. However the following should be noted. First, the temperature of the nozzles ($T_n$) was influenced to a minor extent, only by varying $T_0$. $T_n$ varied in the range 800±10° C., while $T_0$ was changed between 710-810° C. during these experiments. Therefore, to a first approximation, the diffusion fluxes of $H_2$ and $H_2S$ ($J_{H2}$ and $J_{H2S}$) through the nozzles from the tube (flow line) 10b to the tube 10a are taken as temperature independent in the reaction. Contrarily, the $MoO_3$ vapor stream ($J_{MoO3}$) was very sensitive to variations in the temperature ($T_0$): $J_{MoO3}=v/M$, wherein v [g/sec] is the evaporation rate, measured by weighting the bucket before and after the experiment; M=144 g/mole is the molecular weight of $MoO_3$. The temperature dependence of $J_{MoO3}$ shows an exponential behavior, and corresponds to the exponential dependence of the oxide vapor pressure on temperature ($T_0$). The highest value of $J_{MoO3}$, which is obtained by the evaporation of $MoO_3$ powder, is a fraction of a percent of the nitrogen gas flux ($J_{N2}$) in the central tube 10a. Therefore, the $MoO_3$ flux does not influence the hydrodynamics of the gas flow in the reactor.

In FIG. 6 the calculated values of $J_{H2}$ are represented by straight lines showing the calculated fluxes of hydrogen in the entrance to the nozzles 23 for three different $H_2$ volume concentrations: 3%, 5% and 8%. For this calculation, $T_n$ was taken to be 800° C. and three hydrogen volume concentrations in the forming gas were considered: 3, 5, and 8%. The hydrogen diffusion is greatly influenced by the counter propagating stream of nitrogen gas, which carries the $MoO_3$ clusters. The $N_2$ flux in the exit of the nozzles 23 is normal to the hydrogen flux. Since the nozzles are narrow, the outflow rate of the carrier gas from the tube 10a to the tube 10b is greatly increased.

Using the flow rates of $J_{N2}$ in the tube 10a and $J_{FG}$ in the tube 10b, and the following cross section areas of tubes 10a and 10b: 0.08 $cm^2$ and 2 $cm^2$, respectively, the laminar rates were calculated to be 5 cm/sec and 0.5 cm/sec, respectively.

The outflow of $N_2$ from the nozzles dilutes the hydrogen concentration in the forming gas by a factor of 10 ($C_{H2}^o=C_{H2}^{FG}/10$), if the mixing is completed instantaneously. In reality, the mixing is not ideal and therefore this factor is higher. Similar effect holds for the $H_2S$ concentration. This overwhelming effect slows down the diffusion of hydrogen from the tube 10b to the tube 10a considerably. Another effect, which plays a much smaller role, is the dilution of the hydrogen gas by the nitrogen in the reduction volume. This effect reduces the effective hydrogen concentration, available for the reduction reaction by a few percents only.

The calculated hydrogen flux $J_{H2}(x=0)$ from the above model is $1.8*10^{-8}$ mole/sec for 5% $H_2$ in the forming gas.

Comparing between the experimentally determined $J_{MoO3}$ and the calculated $J_{H2}$, the following should be noted. In FIG. 6, the bisection point ($T_1$) of the curves $J_{MoO3}$ and $J_{H2}$ defines two separate zones: to the left and to the right of this point. Since the reaction between $H_2$ and $MoO_3$ molecules is very efficient, the reduction process depends on the relative fluxes of the two reactants. To the left of the bisection point $T_1$, including $T_1$, $J_{H2}/J_{MoO3} \geq 1$, and consequently the hydrogen excess results in a very efficient reduction of the molybdenum oxide clusters into pure $MoO_2$ (or metallic Mo) particles. In this case, the reaction with $H_2S$ does not afford fullerene-like particles. Consequently, $2H$-$MoS_2$ platelets are obtained in this temperature regime. To the right of $T_1$, $J_{H2}/J_{MoO3} > 1$ and the amount of $H_2$ in the reaction zone is smaller than that of $MoO_3$. Condensation of the clusters to suboxide $MoO_{3-x}$ nanoparticles with subsequent IF-$MoS_2$ synthesis, is preferred in this regime.

The temperature dependence of $J_{MoO3}$ is appreciably stronger than that of $J_{H2}$. Thus, at elevated temperatures $J_{MoO3} >> J_{H2}$, this $H_2$ deficiency leads to an inefficient reduction, and consequently, inefficient formation of the suboxide nanoparticles in this region. Therefore, there exists also an upper temperature threshold ($T_2$) for the IF phase formation. This temperature can be determined experimentally. The temperatures $T_1$ and $T_2$ can be varied to some extent by changing the hydrogen concentration in the forming gas and the nitrogen gas flux, which goes through the tube 10a. The temperature range for fullerene-like particles formation at different hydrogen concentrations was found experimentally: for $C_{H2}$=5%-$T_1$=725° C., $T_2$=785° C.; for $C_{H2}$=8%-$T_1$=735° C., $T_2$=790° C. $T_1$ and $T_2$ are in a good agreement with the calculated values.

Figure 7A:
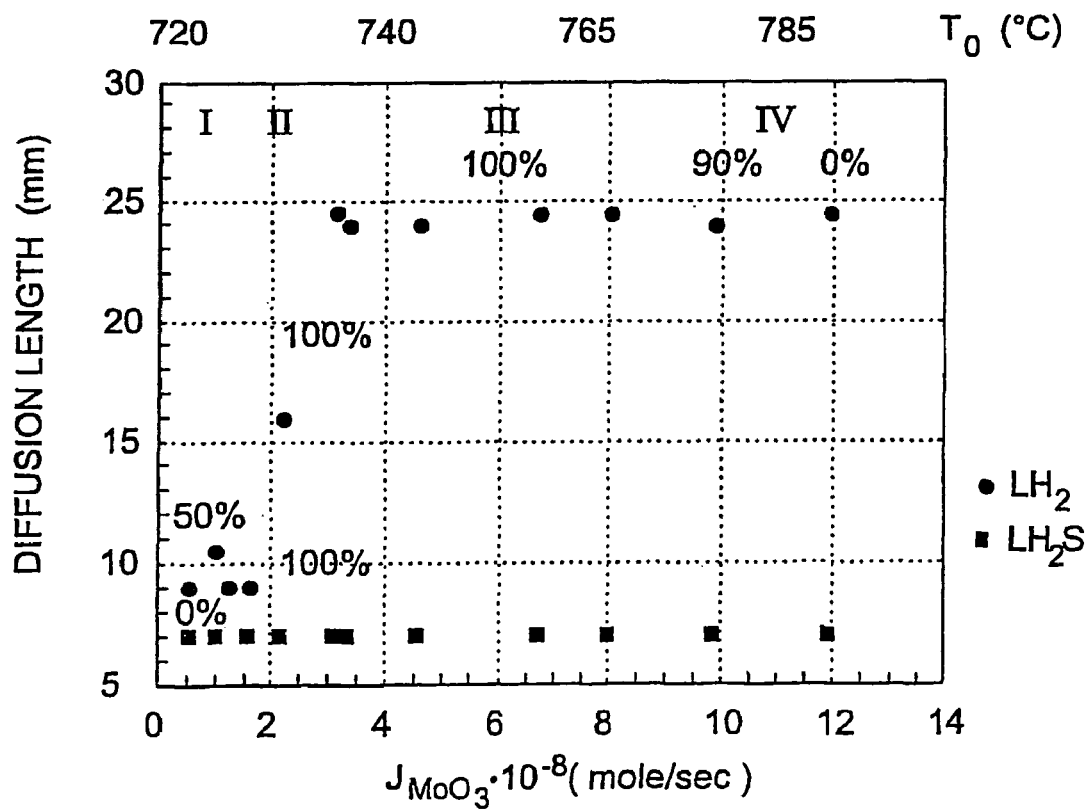
FIG. 7A illustrates the experimental results showing the effect of Molybdenum oxide evaporation rate on the entire diffusion length of the first and second reacting agents and on IF yield.
Figure 7B:
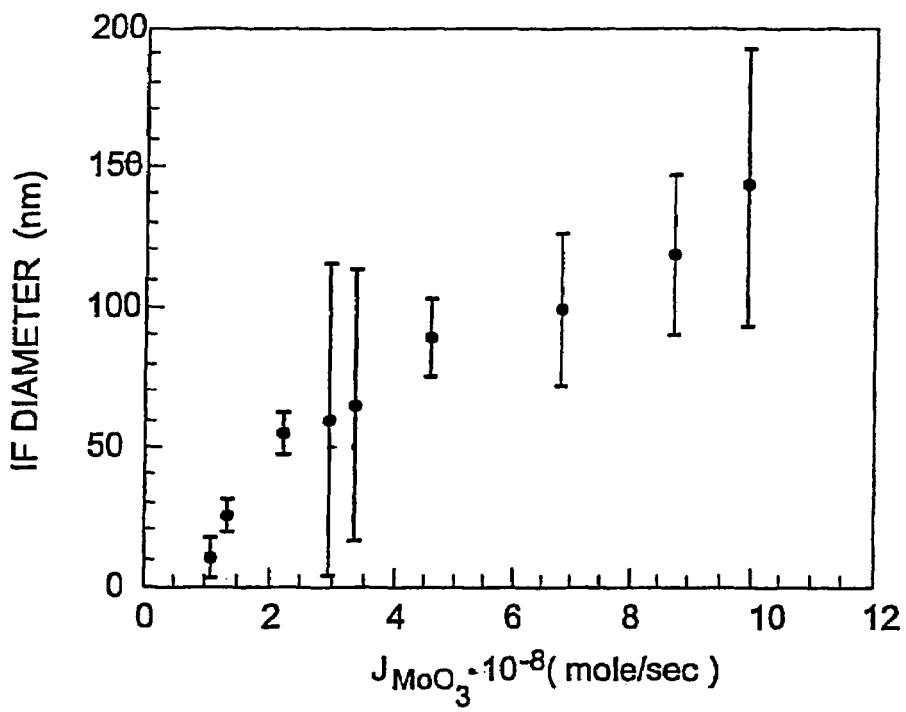
FIG. 7B illustrates the experimental results showing the effect of Molybdenum oxide evaporation rate on the size of the so-obtained IF-$MoS_2$.

FIGS. 7A and 7B show the dependencies of $L_{H2S}$, $L_{H2}$ and the IF particle size on the $J_{MoO3}$ ($T_0$) for two $N_2$ fluxes, respectively. These results are much less obvious if not counterintuitive. Most strikingly in this respect is the fact that the $H_2$ diffusion length $L_{H2}$ increases for increasing $J_{MoO3}$ (FIG. 7A). This result reflects the coalescence of the partially reduced oxide clusters into larger nanoparticles (as evident from the Equation 2 above). In fact, this condensation is the most crucial step in the gas phase synthesis of IF-$MoS_2$. Four different temperature zones can be discerned in FIG. 7A, reflecting the variation in IF size and yield. Zone I ($T_0$=710-725° C.) Zone I in FIG. 7A corresponds to low and constant values of $L_{H2}$ (and $L_{H2S}$). As is clear from FIG. 5, $L_{H2}$ is about 1 cm and $L_{H2S}$ is about 0.7 cm in this zone. This region is also characterized by a relatively small values of $J_{MoO3}$. While 2H platelets are preferred on the left-hand side of zone I, IF-$MoS_2$ are obtained on the right hand side of this zone. The hydrogen flux $J_{H2}$ was estimated from Fick's law. It is found to be on the same order of magnitude as the lowest value of $J_{MoO3}$ (on the left-hand side of zone I). Therefore, on the left side of zone I there is sufficient hydrogen to reduce the molecular clusters into metallic Mo (m=9 in Equation 1), which reacts hastily with $H_2S$. Furthermore, the low density of the molybdenum oxide clusters in the reduction volume results in a low encounter probability and consequently small (<5 nm) nanoparticles. These reactions however, are unable to produce IF-$MoS_2$ and the formation of platelets (2H-$MoS_2$) is therefore initially preferred. As the flux of $MoO_3$ increases in zone I, the complete reduction of the oxide clusters into metallic Mo is slowed down. In addition, the density of molybdenum oxide clusters in the reduction volume increases and consequently their encounter probability becomes higher. This leads to a gradual increase in the suboxide nanoparticles size (>5 nm) and, consequently, to an increase in the fraction of the IF phase in the product, towards the right end of zone I.

Zone II is characterized by a dramatic increase of $L_{H2}$ (from 9 to 24 mm) and gradual increase in the (IF) nanoparticles sizes (from 20 nm to 100 nm) as $J_{MoO3}$ increases modestly from 2 to $4.10^{-8}$ mole/sec. It should be noted that no external parameter, which could lead to an increase in $L_{H2}$, has been varied during this experiment.

The explanation for this non-trivial behavior can be found in the increasing rate of the condensation of the oxide clusters (Equation 2 above) relative to their rate of reduction (Equation 1 above). The surface area of the oxide nanoparticles, which is available for further reduction diminishes as the particle size increases. Therefore the overall rate of reduction (Equation 3 above) goes down, and the hydrogen can propagate deeper into the tube 10a of the reactor, i.e., increasing the diffusion length $L_{H2}$. Thus, the diffusion length $L_{H2}$ increases while the diffusion length $L_{H2S}$ remains almost constant, leaving more time (larger reduction volume) for the small oxide clusters to be reduced and condense onto the oxide nanoparticles. This leads to coarsening of the oxide nanoparticles prior to their encounter with the $H_2S$ gas. The larger oxide nanoparticles are characterized also by smaller deviation from stoichiometry (smaller x in Equation 2 above), which is favorable for IF formation. Therefore, the average size of the IF nanoparticles in the product increases in this zone (FIG. 7B). The increase of $L_{H2}$ in zone II can be attributed to the condensation reaction, which is induced by the reduction of the $(MoO_3)_3$ clusters.

When the $H_2$ diffusion length $L_{H2}$ reaches its saturation value (Zone III, $T_0$=740-780° C.), large IF nanoparticles with a relatively narrow size distribution were obtained. Subsequently, a slow increase of the IF nanoparticles size with $J_{MoO3}$ (FIG. 7B) is observed. It should be noted that for high values of $J_{MoO3}$, the fraction of IF nanoparticles in the product decreases again (Zone IV, $T_0$=780-810° C.). In parallel, increasing $J_{MoO3}$ leads to a gradual and small increase in the IF particle size, from 100±20 nm on the left hand side of zone III to 150±50 nm on the right hand side of zone III. This indicates that in this zone the rate of reactions 2 and 3 do not vary with increasing $J_{MoO3}$ and consequently the IF size reaches it maximum value.

Zone IV of FIG. 7B is characterized by an increase of the fraction 2H-$MoS_2$ platelets on expense of the IF nanoparticles in the product. Also, $J_{MoO3}$ increases exponentially, beyond a certain threshold. This effect is attributed to the large density of $(MoO_3)_3$ clusters in the vapor phase, which can not be effectively reduced by the hydrogen gas. Therefore, the efficacy of the condensation process of the clusters into molybdenum suboxide nanoparticles diminishes.

Figure 7C:
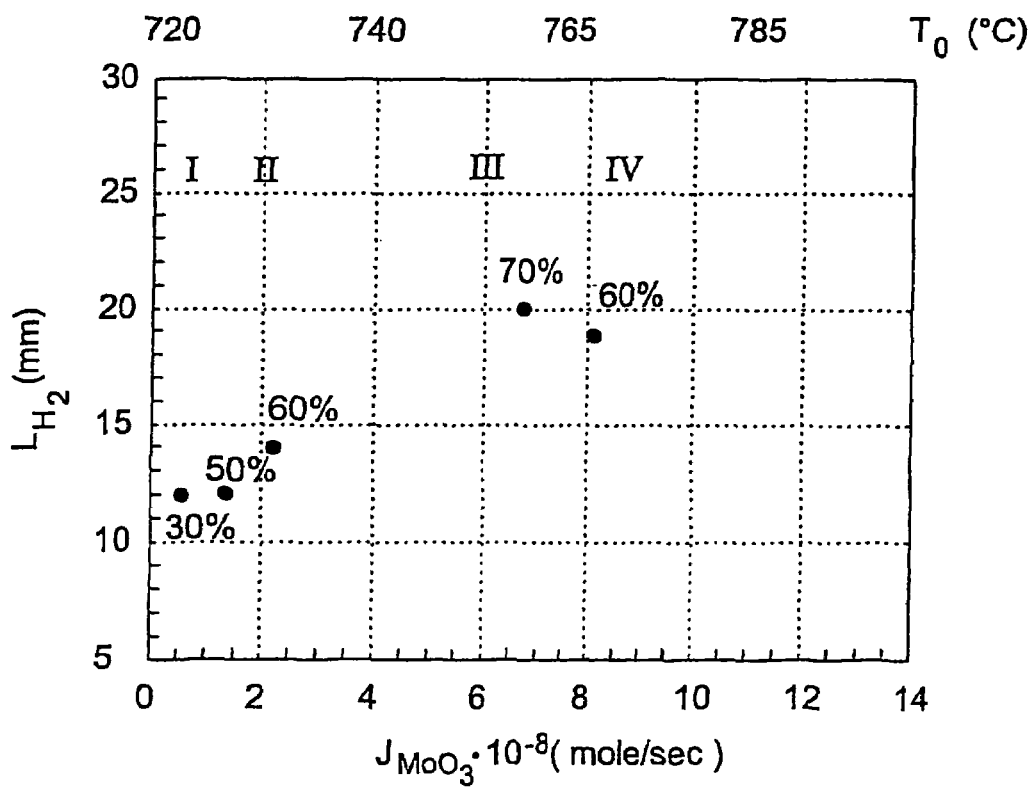
FIG. 7C illustrates the experimental results showing the effect of Molybdenum oxide evaporation rate on the diffusion length of the first reacting agent.

Turning now to FIG. 7C, there is shown that when the $N_2$ flow is increased from 38 to 44 ml/min, the general form of the $H_2$ diffusion length $L_{H2}$ and IF yield vs. $J_{MoO3}$, is preserved. However, increasing the $N_2$ gas flow leads to a reduction of the $H_2$ diffusion length $L_{H2}$ and the yield, and so a pure IF phase could not be obtained under this high $N_2$ flux.

As is clear from FIGS. 6 and 7B, increasing the temperature inside the interval suitable for IF formation, leads to an increase in the ratio $J_{MoO3}/J_{H2}$, which in turn leads to bigger nanoparticles size.

Since the $N_2$ gas flow (FIG. 7C) is in opposite direction to the $H_2$ flux, increasing the former will lead to a slower in-diffusion of hydrogen from the tube 10b into the tube 10a.

This in turn leads to a decrease in $L_{H2}$, and therefore the reduction volume shrinks and the conditions for the IF phase synthesis become less favorable. In FIG. 7A, a pure IF phase is obtained at 765° C. However, if the $N_2$ gas flow increases from 38 to 44 ml/min (FIGS. 7C and 3B), the IF phase constitutes only 70% of the total product. The deterioration of the reaction product is attributed to the reduced supply of $H_2$ into the reactor. Increasing the hydrogen concentration in the forming gas leads to an increase of the diffusion flux of hydrogen from the tube 10b to tube 10a and to an increase in $L_{H2}$, which consequently leads to an increase of the IF yield to 100%, as shown in FIG. 4.

Once the reaction mechanism and the effect of the various experimental parameters were studied, rational size control of the IF nanoparticles became feasible, too. For instance, FIG. 7B shows that as $J_{MoO3}$ ($T_o$) increases so are the nanoparticles' sizes (5-200 nm), FIG. 3A shows that as $J_{N2}$ decreases the nanoparticles size increases (100-300 nm). The error-bar for each $J_{MoO3}$ is indicative of the scattering of the particles' size in the particular synthesis.

The size of the fullerene-like nanoparticles was shown to be determined by the size of the suboxide nanoparticles. In turn, the size of the suboxide nanoparticles depends on the density of the oxide molecular clusters—$Mo_3O_9$ ($J_{MoO3}$) in the reduction volume and the size of the reduction volume ($L_{H2}$-$L_{H2S}$). Variation of these parameters permits a full control of the average particle size.

It is important to emphasize that the experimental parameters are not independent of each other and in fact are highly correlated. For example, in order to decrease H2 flux ($J_{H2}$), one could decrease the $C_{H_2}$ in the forming gas, but also to increase the $N_2$ flow rate or decrease $S_n$. These examples illustrate the complexity of this process and explain the great difficulty to control the synthesis of IF-$MoS_2$.

The effect of other experimental parameters on the IF particle size is more involved and was studied to some extent. IF particles as large as 300 nm could be produced, using the present technique, beyond this size 2H platelets were favored during the growth process.

Figure 8:
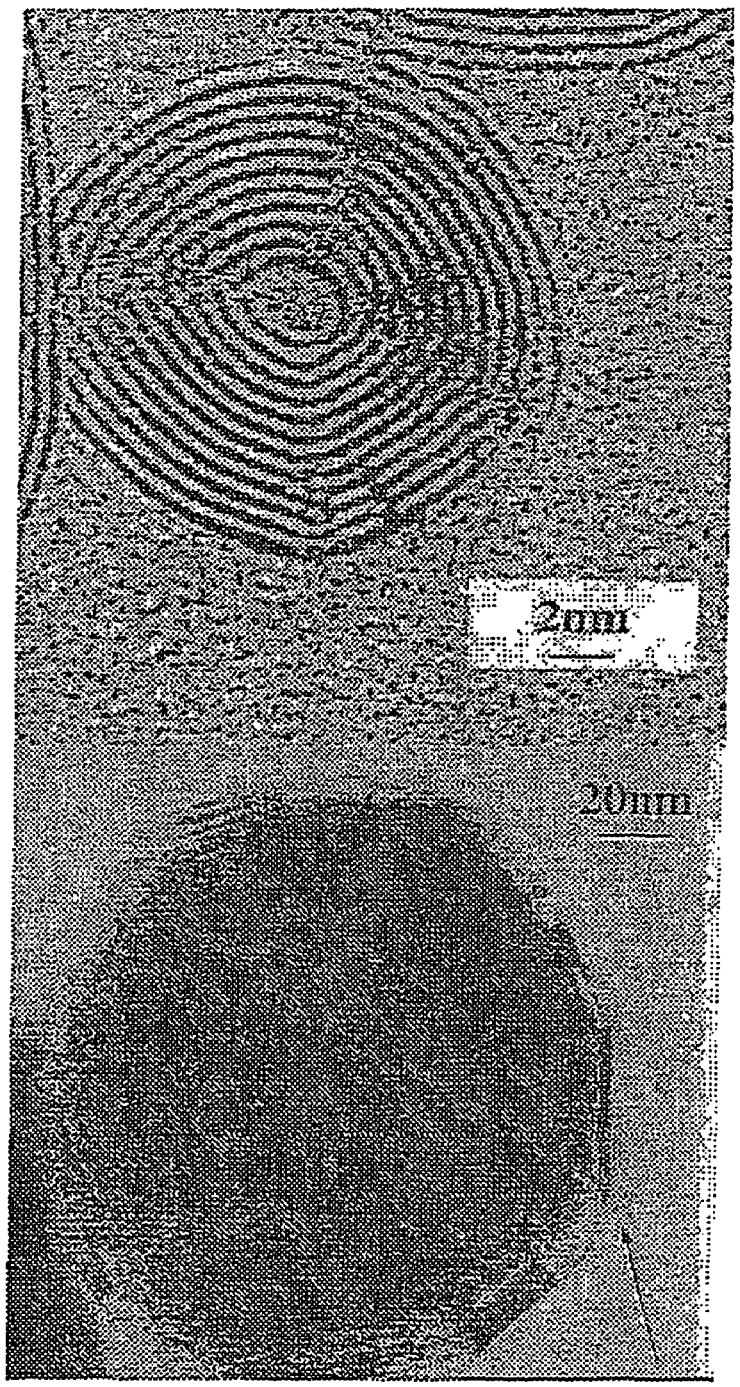
FIG. 8 illustrates images of the IF nanoparticles with two different sizes.
Figure 9:
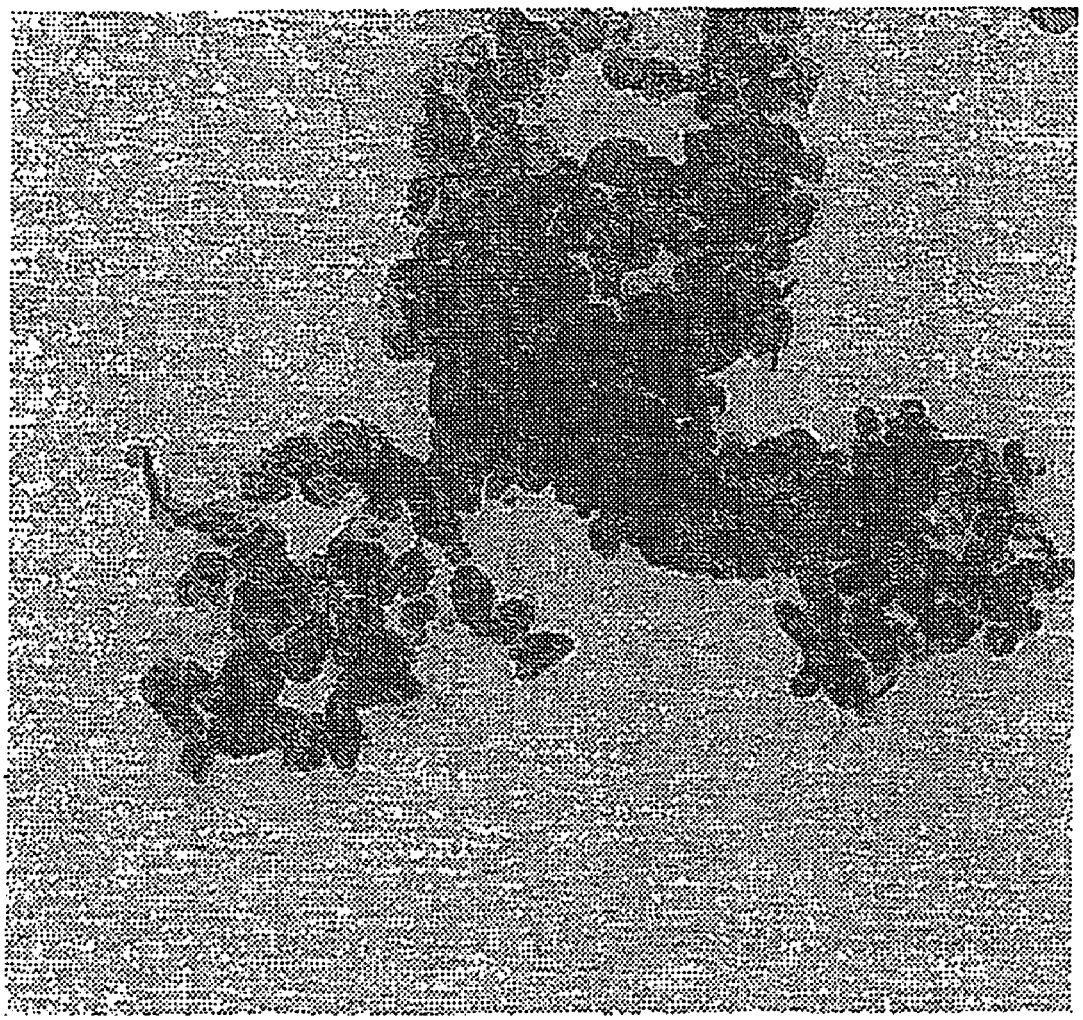
FIG. 9 illustrates a Transmission Electron Microscope (TEM) image of a plurality of IF nanoparticles.

FIG. 8 shows a typical image of IF nanoparticles with two different sizes (2 nm and 20 nm) obtained with the above technique. FIG. 9 shows a Transmission Electron Microscope (TEM) image of a plurality of IF nanoparticles obtained in the reactor illustrated in FIG. 1A.

The following are some more examples of the present invention.

EXAMPLE 2

Figures 10A, 10B:
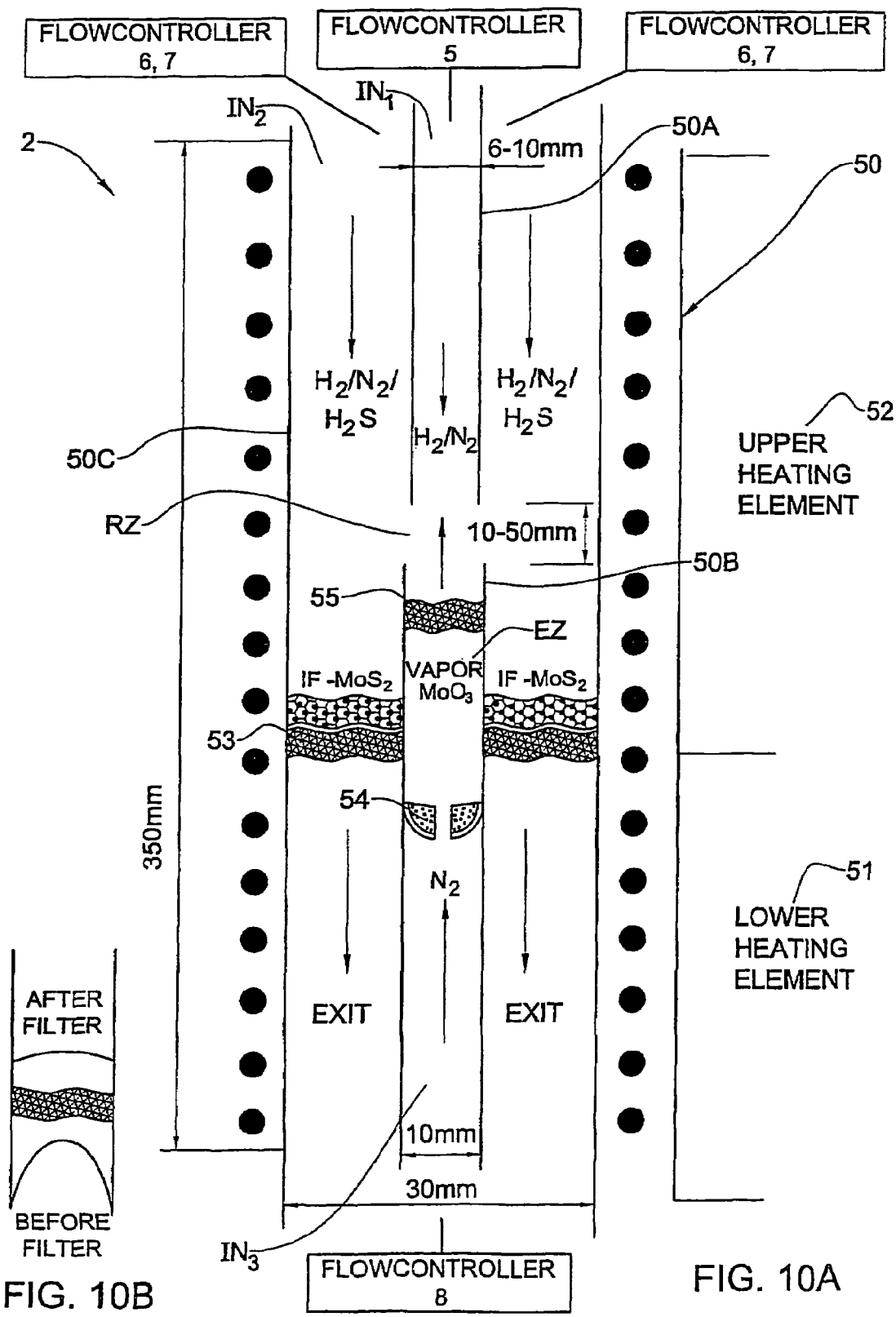
FIG. 10A is a schematic illustration of a chemical reactor according to another embodiment of the invention.
FIG. 10B is a schematic illustration of the gas velocity profile in tube B of the chemical reactor of FIG. 10A.

Reference is made to FIG. 10A illustrating apparatus, generally designate 2, used for production of IF-$MoS_2$ nanostructures. In the apparatus 2, a chemical reactor 50 is differs from reactor 10 of the previously described reactor 1 in several structural elements. The nozzles present in reactor 1 were eliminated. This was done since the nozzles clogged after several hours of reaction. Their elimination permits a longer reaction time resulting in higher yields. However, their elimination requires different control means on the diffusion process. For such a control, reactor 50 comprises two additional features, an additional tube 50A and filter 55 (vide infra). Thus, the chemical reactor 50 consists of three concentric quartz tubes: spaced-apart internal tubes 50A and 50B (of, respectively, narrower and higher diameters in the present example), and an external tube 50C.

The reactor 50 presents a vertical flow line defining an evaporation zone EZ and a reacting zone RZ. The RZ starts inside tube 50B at its distal end and extends towards the gap between tubes 50A and 50B and further into the outer tube 50C, where the resulting product is collected (precipitates) on a ceramic filter 53. $MoO_3$ powder is maintained at the lower part of the evaporation zone EZ at tube 50B. The $MoO_3$ powder is kept in a small bucket 54 (in the amount of 1.5 g in the present example). The reactor 50 is associated with vessels (not shown) containing, respectively, $N_2$ (an inert carrier), $N_2/H_2$ (forming gas, containing a first reacting agent-reducing gas) and $H_2S$ (a second reacting agent-sulfidizing agent). These materials are sequentially fed to the reactor 50 through flow controllers 5, 6, 7 and 8 via three inlet openings ($IN_1$, $IN_2$ and $IN_3$) for such feedings. Controller 8 controls the flow of $N_2$ via $IN_3$ towards the solid $MoO_3$ powder through the EZ to the RZ along tube 50B. Controllers 6 and 7 control the flows of $N_2/H_2$ and $H_2S$ towards the reacting zone RZ along the path of tube 50C. Controller 5 controls the flow of $H_2/N_2$ (forming gas) through the inner tube 50A towards the RZ.

In the first stage of the reaction, $N_2$ flowing from $IN_3$ carries the vaporized $MoO_3$ particles towards the distal end of tube 50B. A mixture of $H_2/N_2$ flowing from $IN_1$, along tube 50A partially penetrates into tube 50B commencing the reaction. As explained above for the reactor described in FIG. 1A, the diffusion depth of $H_2$ (the reducing gas) into the stream of $MoO_3$ vapor carried with the aid of $N_2$ affects the size distribution as well of the formed nanoparticles.

The typical velocity distribution (laminar flow) in a tube prior to passage through the filter (before filter) is schematically shown in FIG. 10B. The in-depth flow of $H_2$ into the tube is smaller in the central region of the tube than in the peripheral regions thereof (in the vicinity of the tube walls), ultimately leading to a variations in flow that ultimately would result in a size variations of the formed nanoparticles. In order to average the velocity of flow and thereby attain to a uniform flow of $H_2$ into tube 50B, the filter 55 was added in the vicinity of the distal end of tube 50B.

Referring back to FIG. 10B, the velocity profile resulting from the addition of the filter 55 is shown (after filter). Generally, the diameter of tube 50A (6-10 mm) is less or equal to that of tube 50B (10 mm), and the distance between tubes 50A and 50B is varied (for example, it may vary from about 10 mm to about 50 mm). Varying such parameters as the diameter of tube 50A and the distance between tubes 50A and 50B allows for the efficient control of the diffusion of $H_2$ into tube 50B and therefore provides efficient control of the resulting particle size. Thus, the provision of the additional two elements in the reactor 50 compared to reactor 10, namely tube 50A and the filter 55 at the distal end of tube 50B, serve as effective control means and are efficient substitute for the rejected nozzles.

The second stage of the reaction occurs where the reduced suboxide $MoO_{3-x}$ particles interact with the flow of $H_2/N_2$ and $H_2S$ (comprising the second reacting gas) flowing through $IN_2$. The flow carries the formed IF-$MoS_2$ particles towards the ceramic filter 53 where the particles are collected and further react with $H_2S$. At the lower part of tube 50C, reaction gases are discharged from the reactor through an outlet opening EXIT. The geometry of the reactor 50 is shown in FIG. 10A in a self-explanatory manner.

As further shown in FIG. 10A, two heating elements 51 and 52 (constituting a temperature control means) located outside the reactor 50 are operated to provide required temperature conditions of the entire process. More specifically, the lower heating element 51 serves for maintaining the temperature conditions required for the evaporation of the metal oxide, while the upper heating element 52 serves for providing and maintaining the temperature condition required for the chemical reactions. Practically, the three-tube quartz reactor 50 was installed inside a tube like oven (i.e., two heating elements). The temperature profile of the oven was accurately determined with a precision of ±1° C. along the designed quartz reactor.

The temperature in the EZ is from about 710° C. to about 830° C., and in the RZ it is from about 650° C. to about 950° C. Flowcontroller 5 is set to send a mixture $H_2/N_2$ gases through tube 50A in an amount of from about 40 cc/min to about 150 cc/min (comprising from 1 to 10% of $H_2$). Flowcontroller 8 is set to send $N_2$ gas for deriving the vaporized $MoO_3$ particles along tube 50B in an amount of from about 20 cc/min to about 150 cc/min, and flowcontrollers 6 and 7 are set to send a mixture of $H_2/N_2/H_2S$ in an amount of about 200 cc/min containing $H_2S$ gas in an amount of from about 2 cc/min to about 10 cc/min.

EXAMPLE 3

Figure 11:
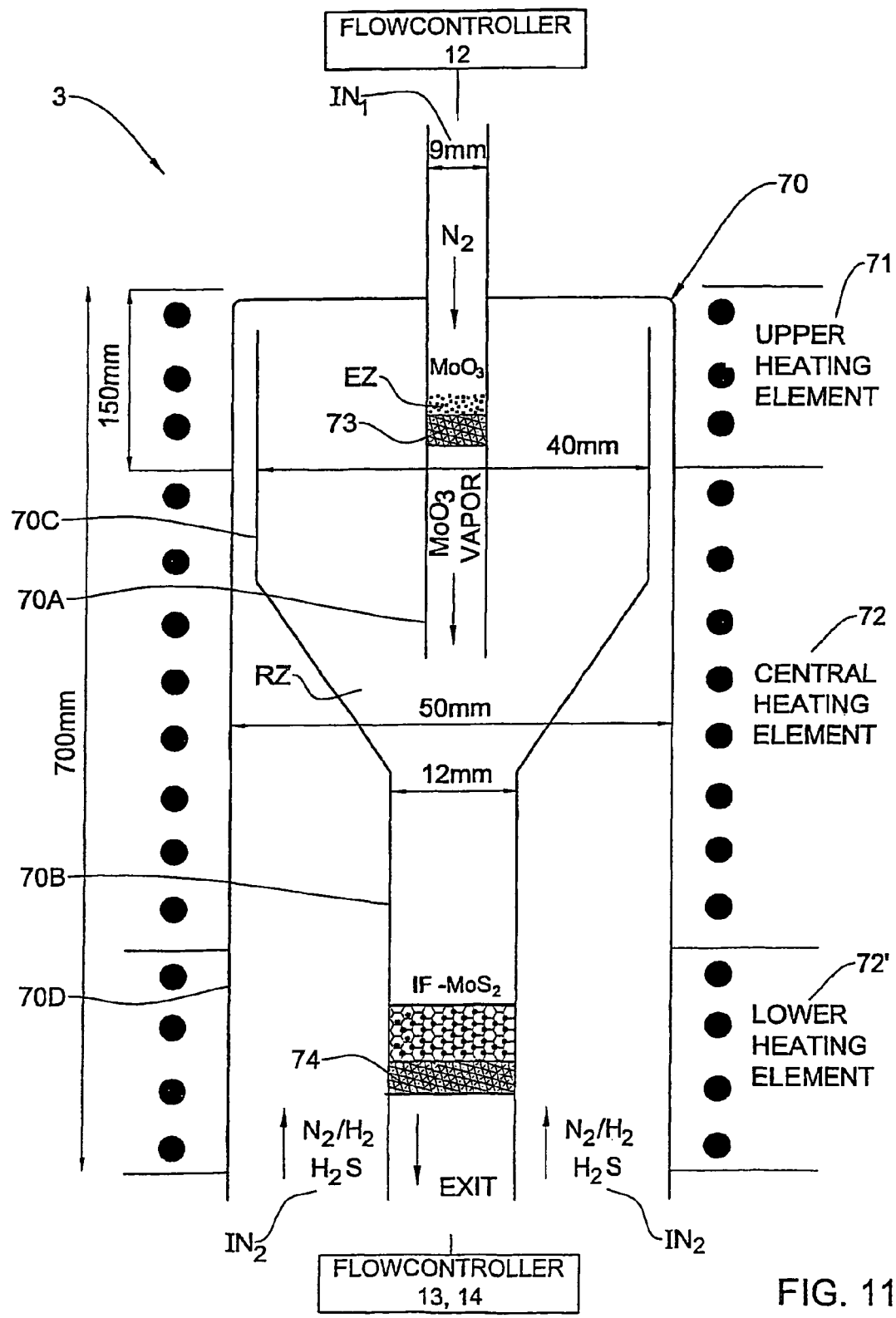
FIGS. 11 and 12 are schematic illustrations of two more examples of a chemical reactor according to the invention.

FIG. 11 illustrates an apparatus 3 used for production of IF-$MoS_2$ nanostructures. The apparatus 3 comprises a chemical reactor 70 that consists of three concentric quartz tubes 70A, 70B and 70C. The arrangement is such that the interior of tubes 70B and 70C are connected to each other, thereby defining inner tubes 70A and 70B, and external tube 70C. This arrangement is located inside a tube-like housing 70D. The reactor 70 presents a vertical flow line defining a reacting zone RZ starting inside the inner tube 70A at its distal end and extending into tube 70B. The resulting product is collected (precipitates) on a ceramic filter 74 located at the bottom part of the tube 70B. $MoO_3$ powder is maintained in the tube 70A being located within an evaporation zone EZ on an additional filter 73. The reactor 70 is associated with vessels (not shown) containing, respectively, $N_2$ (constituting an inert carrier), $H_2/N_2$ (forming gas-constituting a first reacting agent) and $H_2S$ (constituting a second reacting agent). These materials are sequentially fed into the reactor 70 through flow controllers 12, 13 and 14 via two-inlet opening $IN_1$, $IN_2$. The controller 12 controls the flow of $N_2$ towards the evaporation and reaction zones EZ and RZ through the inner tube 70A, and controllers 13 and 14 control the flows of $N_2/H_2$ and $H_2S$, respectively, through the tube-like housing 70D towards the reacting zone RZ through the external tube 70C towards the inner tube 70B. It should be noted, although not specifically shown, that an additional inlet may be provided in the reactor 70 for supplying additional amount of $MoO_3$ powder in a continuous flow or by discrete portions thereof. Also formed in the reactor at its lower part of tube 70B is an outlet opening EXIT for discharging the reaction gases. The geometry of the reactor 70 is shown in the figure in a self-explanatory manner.

In the first stage of the reaction, $N_2$ flowing from $IN_1$ carries the vaporized $MoO_3$ particles towards the distal end of tube 70A. A stream of the forming gas $H_2/N_2$ (comprising the first reacting agent) and $H_2S$ (comprising the second reacting agent) flows from $IN_2$ along the housing 70D through tube 70C towards tube 70B. However, some of these gases also undergo diffusion into the tube 70A, where $H_2$ (first reacting agent) being lighter diffuses deeper than $H_2S$ thereby commencing the reaction by partially reducing the evaporated $MoO_3$ to suboxide nanoparticles. As explained above, the diffusion depth of $H_2$ into the stream of $MoO_3$ vapor carried with the aid of $N_2$ affects the size of the formed nanoparticles. Due to the absence of nozzles, the gas flow is laminar (as shown in FIG. 10B), i.e., the flow rate is uneven across the tube, decreasing from the central region of the tube towards its peripheral regions. Hence, the diffusion depth is uneven, and therefore the particle size will have a rather large distribution. In the second stage of the reaction, the reduced suboxide particles are further swept out of tube 70A to the gap between tubes 70A and 70B and interfuse with the main flow of $H_2S$ (second reacting gas) and $N_2/H_2$ flowing through tube 70C down towards tube 70B. The formed IF-$MoS_2$ particles are swept by the gas flow while the reaction of sulfidization continues, descend in tube 70B and are collected on the filter 74. The gas flow rates are the following. The flow of $H_2/N_2$ (forming gas) was from about 50 cc/min to about 100 cc/min (comprising from 1 to 10% of $H_2$), that of $H_2S$ was from about 4 cc/min to about 20 cc/min and that of $N_2$ was from about 60 cc/min to about 200 cc/min.

Further provided in the reactor 70 are heating elements: upper, central and lower elements 71, 72 and 72' (constituting together a temperature control means) accommodated outside the reactor 70. The heating elements are operated to provide required temperature conditions of the entire process. More specifically, the upper heating element 71 serves for maintaining the temperature conditions required for the evaporation of the metal oxide, while the lower and central heating elements 72 and 72' serve for providing and maintaining the temperature condition required for the chemical reactions. Practically, the reactor 70 was installed inside a tube like oven (i.e., two heating elements). The temperature profile of the oven was accurately determined with a precision of ±1° C. along the designed quartz reactor.

The reactor 70, being double the size of the reactor 10 (Example 1), allows for higher yield (about 200 mg/hr of reaction product) as compared to that of reactor 10 (about 10 mg/hr). In order to compensate for a higher size distribution of the formed nanoparticles as compared to that of the reactor 10), and even more increase the yield of production, the reactor 70 can be modified as exemplified below.

EXAMPLE 4

Figure 12:
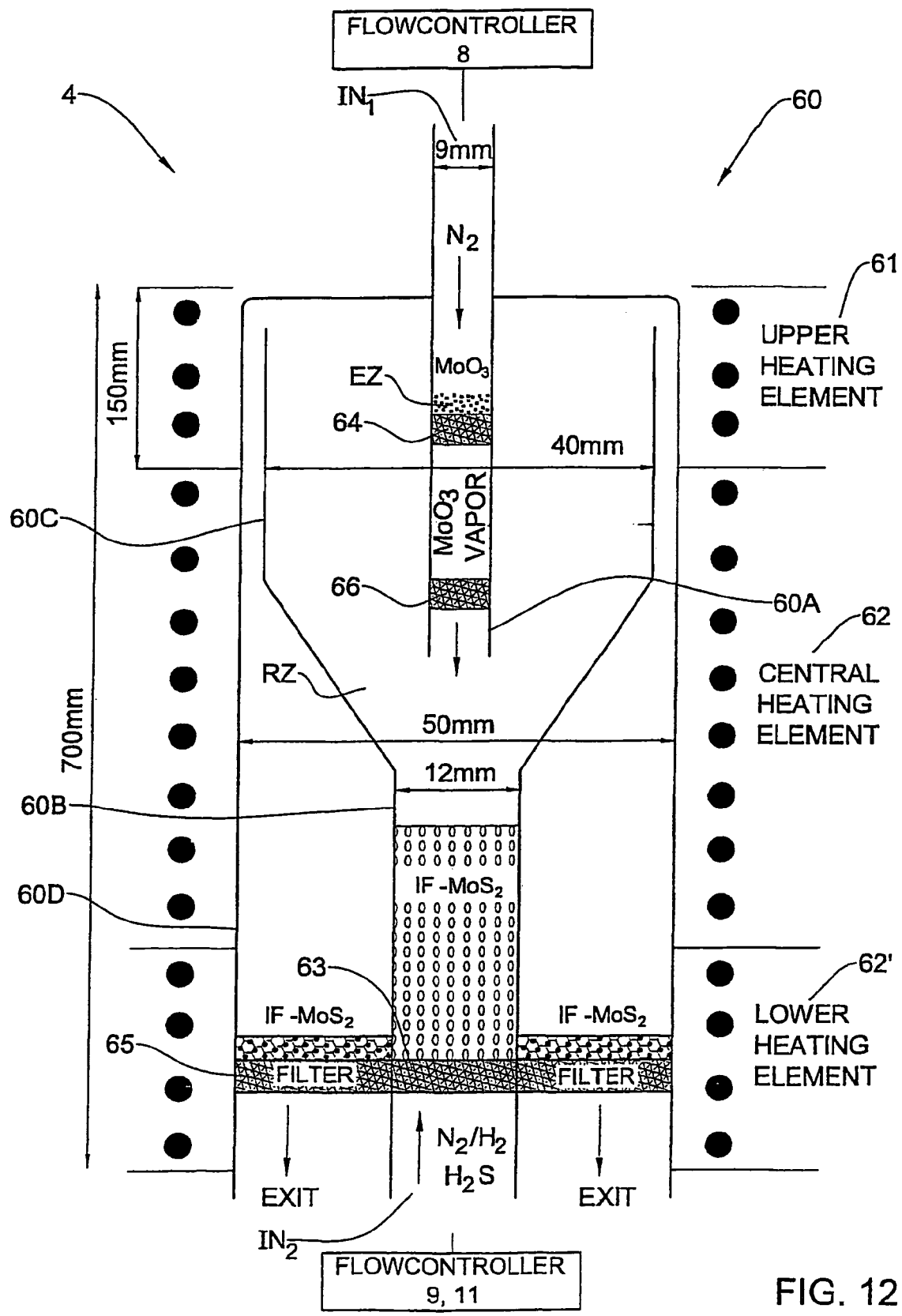

FIG. 12 illustrates yet another apparatus 4 used for production of IF-$MoS_2$ nanostructures, utilizing a chemical reactor 60 having a somewhat different design as compared to the reactor 70. Reactor 60 has substantially the same geometry as the reactor 70, but its design provides for different gas-flow directions, and comprises an additional filter 66, the purpose of which will be described further below. Reactor 60 presents a fluidized bed reactor, comprising three concentric quartz tubes 60A, 60B and 60C arranged as described above with respect to reactor 70, and installed in a tube-like housing 60D. A reacting zone RZ starts inside the inner tube 60A at its distal end and extends into tube 60B. The resulting product is collected (precipitates) on a ceramic filter 63 located at the bottom part of the tube 60B. $MoO_3$ powder is maintained on a filter 64 located in the tube 60A within an evaporation zone EZ above the reacting zone RZ. Tube 60A further comprises at its distal end another filter 66 for averaging the velocity of flow and attaining to a substantially uniform flow of gas. The reactor 60 is associated with vessels (not shown) containing, respectively, $N_2$ (constituting an inert carrier), $H_2/N_2$ (forming gas-constituting a first reacting agent) and $H_2S$ (constituting a second reacting agent). These materials are sequentially fed to the reactor 60 through flow controllers 8, 9 and 11 via two-inlet opening $IN_1$, $IN_2$. The controller 8 controls the flow of $N_2$ towards the evaporation and reaction zones EZ and RZ through the inner tube 60A, and controllers 9 and 11 controls the flows of $N_2/H_2$ and $H_2S$, respectively, towards the reacting zone RZ through the lower part of tube 60B. It should be noted, although not specifically shown, that an additional inlet may be provided in the reactor 60 for supplying additional amount of $MoO_3$ powder in a continuous flow or by discrete portions thereof. Also formed in the reactor at its lower part of tube 60D is an outlet opening EXIT for discharging the reaction gases. Some small particles formed in the course of the reaction (as will be described below) are carried by the gas flow from tube 60C into tube-like housing 60D and are collected on filter 65. The geometry of the reactor 60 is shown in the figure in a self-explanatory manner.

In the first stage of the reaction, $N_2$ flowing from $IN_1$ carries the vaporized $MoO_3$ particles towards the distal end of tube 60A. A stream of the forming gas $H_{2N2}$ (comprising the first reacting agent) and $H_2S$ (comprising the second reacting agent) flows from $IN_2$ along tube 60B. $H_2$ (first reacting agent) being lighter than $H_2S$ diffuses deeper into tube 60A thereby commencing the reaction by partially reducing the evaporated $MoO_3$ to suboxide nanoparticles. As explained above, the diffusion depth of $H_2$ into the stream of $MoO_3$ vapor carried with the aid of $N_2$ affects the size of the formed nanoparticles. The use of filter 66 enables obtaining even diffusion and, consequently, even particles size distribution. In the second stage of the reaction, the reduced suboxide particles are further swept out of tube 60A to the gap between tubes 60A and 60B and interfuse with the main flow of $H_2S$ (second reacting gas) and $N_2/H_2$ flowing through tube 60B. The formed IF-$MoS_2$ particles begin slowly to descend in tube 60B under the fluidized-bed conditions towards the filter 63. The slow descendence occurs as a result of the opposite gas flowing from the bottom of tube 60B. This fluidized bed condition absolutely avoids effect of filter clogging, and thereby allows further significant increase of yield of production. At the end of the reaction, after turning off the gas flow, the formed IF-$MoS_2$ particles are collected on filter 63.

Further provided in the reactor 60 are heating elements: upper, central and lower elements 61, 62 and 62' (constituting a temperature control means) accommodated outside the reactor 60. The heating elements are operated to provide required temperature conditions of the entire process. More specifically, the upper heating element 61 serves for maintaining the temperature conditions required for the evaporation of the metal oxide, while the lower and central heating elements 62 and 62' serve for providing and maintaining the temperature condition required for the chemical reactions. Practically, the three-tube quartz reactor was installed inside a tube like oven (i.e., three heating elements). The temperature profile of the oven was accurately determined with a precision of $\pm 1°$ C. along the designed quartz reactor.

It is evident from the experimental results that pure IF-$MoS_2$ phase with a well-defined size, relatively narrow size distribution, and high yield (more than 200 mg/hr) could be obtained by the present invention. Variations of the nitrogen flow rate ($J_{N2}$), control of the diffusion process (e.g., by means of nozzles opening cross section ($S_n$) or provision of filtering means), as well as the $H_2$ and $H_2S$ concentrations ($C_{H2}$ and $C_{H2S}$), lead to changes in $H_2$ and $H_2S$ diffusion lengths ($L_{H2}$ and $L_{H2S}$), which affect the production of the IF phase. These dependencies follow the changes of the flow rates $J_{MoO3}$, $J_{H2}$ and $J_{H2S}$, which can be estimated from the known Fick laws. Although the correlation between the diffusion length $LH_2$ ($L_{H2S}$) and IF formation is not simple, it can be concluded that the IF phase is obtained if the reduction volume ($L_{H2}$–$L_{H2S}$) is larger than some minimum value, which depends on the experimental conditions. The dependencies of the diffusion length $L_{H2}$ on the flow rate $J_{MoO3}$ (at the evaporation temperature $T_0$), which are shown in FIGS. 7A and 7C, are intuitively non-trivial. The flux of $H_2$ propagates in opposite direction to that of $MoO_3$, and it would be expected that an increase in the $MoO_3$ flow rate ($J_{MoO3}$) would limit the diffusion of $H_2$ inside the tube 10a. However, an opposite behavior was observed, which can not be explained through a linear diffusion process.

The invention claimed is:

1. An apparatus for obtaining inorganic fullerene-like nanostructures, the apparatus comprising:
    a chemical reactor associated with a supply system for controllably supplying reacting agents into the reactor;
    a collector system for collecting the inorganic fullerene-like nanostructures being produced in the reactor; and,
    a temperature control system which is configured and operable to provide a predetermined temperature profile inside the reactor defining an evaporation zone,
    wherein the chemical reactor comprises:
    at least first and second separate flow lines configured for vertical flow of the reacting agents therethrough and to define first and second reacting zones, the first flow line leading into the second flow line; and,
    a bucket for containing a metal oxide powder,
    wherein the reacting zones including a zone inside the first flow line within its distal end below said bucket, which bucket is located in the first flow line in the vicinity of the evaporation zone where the metal oxide powder is evaporated from said bucket and metal oxide vapor is driven from said evaporation zone towards the first reacting zone where a first reduction-reaction occurs followed by condensation and growth of sub-oxide nanoparticles, the suboxide nanoparticles flowing down to the second reacting zone where a second reaction occurs caused by subsequent reactions with the first and second reacting agents respectively, said reacting agents supplied by diffusion from the second flow line in a direction opposite to the vapor flow from the bucket.

2. The apparatus of claim 1, wherein the temperature control system is configured and operable to provide a rate of the metal oxide evaporation and the oxide vapor concentration in the first reacting zone.

3. The apparatus according to claim 1, wherein the temperature control system includes heating elements accommodated in the vicinity of the flow lines.

4. The apparatus according to claim 3, wherein the heating elements are accommodated outside the reactor.

5. The apparatus according to claim 4, wherein the temperature control system is configured as a controllably operable oven configured for surrounding the reactor.

6. The apparatus according to claim 4, wherein the heating elements include upper and lower heating elements, the upper heating element serving for maintaining the temperature conditions required for the controllable amount of evaporation of the metal oxide, and the lower heating element serving for providing and maintaining the temperature conditions required for the chemical reactions.

7. The apparatus of claim 6, wherein said chemical reactions include partial reduction of the metal oxide vapor, condensation of the vapor into nanoparticles of suboxide and conversion of the metal-oxide into the sulfide nanoparticles.

8. The apparatus according to claim 1, comprising a control system for controlling operation of the supply system and of the temperature control system, thereby enabling said evaporation of the metal oxide and enabling control of processes of the diffusion of the first and second reacting agents so as to provide interaction of the metal oxide vapor with the first reacting agent prior to its interaction with the second reacting agent.

9. The apparatus according to claim 1, wherein the reactor comprises three concentric tubes, including an external tube, an inner tube being said first flow line, and an intermediate tube being said second flow line.

10. The apparatus according to claim 9, wherein the reacting zones extend from the inside of the first flow line towards a bottom part of the reactor, where the nanostructures are collected by precipitation on a filter of said collector system.

11. The apparatus according to claim 1, wherein the first flow line within its distal end has a cross-section smaller than the other portion of the first flow line.

12. The apparatus according to claim 9, comprising a control system for controlling operation of the supply system and of the temperature control system, thereby enabling said evaporation of the metal oxide and enabling control of processes of the diffusion of the first and second reacting agents so as to provide interaction of the metal oxide vapor with the first reacting agent prior to its interaction with the second reacting agent.

13. The apparatus according to claim 11, wherein said control system comprises nozzles accommodated at the first and second reacting agents input to the first flow line, the nozzles being operated to provide desired diffusion paths for the first and second reacting agents.

14. The apparatus according to claim 1, wherein the bucket is configured as a filter.

15. The apparatus according to claim 1, comprising a filter accommodated inside the first flow line.

16. The apparatus according to claim 1, comprising an additional, third flow line for supplying the first reacting agent in a direction towards the first flow line.

17. The apparatus according to claim 15, comprising an additional, third flow line for supplying the first reacting agent in a direction towards the first flow line.

18. The apparatus according to claim 17, wherein the three flow lines are arranged as three concentric tubes, the first and third tubes being internal tubes located inside the second tube, the third tube being above the first tube with a gap between them.

19. The apparatus according to claim 18, wherein the first and third tubes have substantially equal cross sectional dimensions.

20. The apparatus according to claim 18, wherein the first and third tubes have different cross sectional dimensions.

21. The apparatus according to claim 20, wherein the first tube has a larger cross-section than the third tube.

22. The apparatus according to claim 18, wherein the reaction zones extend from the inside of the first tube towards the gap between the first and third tubes and further into the second tube, where the inorganic fullerene-like nanostructures are collected by precipitation on a filter of said collector system.

23. The apparatus according to claim 18, wherein said filter inside the first flow line and said third tube serve as a control system for controlling processes of the diffusion of the first and second reacting agents so as to provide interaction of the metal oxide vapor with the first reacting agent prior to its interaction with the second reacting agent.

24. The apparatus according to claim 18, wherein cross sectional dimensions of the third flow line tube and a length of the gap between the first and third tubes are variable parameters, variation of these parameters allowing for efficient control of the diffusion of the reacting agent into the first tube and thus efficient control of the resulting nanostructures' size.

25. The apparatus according to claim 1, wherein the reactor comprises three concentric tubes, including an inner tube being said first flow line and a two-part external tube being the second flow line, interior of the upper and lower parts of the external tube being connected to each other.

26. The apparatus according to claim 25, wherein the first inner tube is located inside the upper part of the external second tube.

27. The apparatus according to claim 26, wherein the upper part of the external tube has cross sectional dimensions reduced toward a connection region with the lower tube part.

28. The apparatus according to claim 25, comprising a tube-like housing containing said three concentric tubes thereinside.

29. The apparatus according to claim 26, wherein the reacting zones extend from the inside the first tube into the lower part of the second tube.

30. The apparatus according to claim 29, wherein the collector system comprises a filter located at the bottom part of the lower external tube.

31. The apparatus according to claim 26, wherein the bucket is constituted by a filter for carrying said metal oxide powder thereon.

32. The apparatus according to claim 26, comprising a filter located inside the first inner tube at its distal end below the bucket, said filter serving for averaging the velocity of flow and attaining to a substantially uniform flow of gas.

33. The apparatus according to claim 26, wherein the temperature control system includes heating elements accommodated in the vicinity of the flow lines outside the reactor, the heating elements including upper, central and lower elements, the upper heating element serving for maintaining the temperature conditions required for the evaporation of the metal oxide, and the lower and central heating elements serving for providing and maintaining the temperature conditions required for the chemical reactions.

34. An apparatus for obtaining inorganic fullerene-like nanostructures, the apparatus comprising:
 a chemical reactor associated with a supply system for controllably supplying reacting agents into the reactor;
 a collector system for collecting the inorganic fullerene-like nanostructures being produced in the reactor; and,
 a temperature control system which is configured and operable to provide a predetermined temperature profile inside the reactor defining an evaporation zone,
 wherein the chemical reactor comprises:
 first and second separate flow lines configured for vertical flow of the reacting agents therethrough and to define first and second reacting zones, the first flow line leading into the second flow line, and an additional, third flow line for supplying the first reacting agent in a direction towards the first flow line; and,
 a bucket for containing a metal oxide powder, said bucket being located in the first flow line in the vicinity of the evaporation zone where the metal oxide powder is evaporated from said bucket and metal oxide vapor is driven from said evaporation zone towards the first reacting zone where a first reduction-reaction occurs followed by condensation and growth of suboxide nanoparticles, the suboxide nanoparticles flowing down to the second reacting zone where a second reaction occurs caused by subsequent reactions with the first and second reacting agents respectively, said reacting agents supplied by diffusion from the second flow line in a direction opposite to the vapor flow from the bucket.

35. The apparatus according to claim 34, wherein the reacting zones includes a zone inside the first flow line within its distal end below the bucket.

36. The apparatus according to claim 34, comprising a filter accommodated inside the first flow line.

37. The apparatus according to claim 36, wherein the three flow lines are arranged as three concentric tubes, the first and third tubes being internal tubes located inside the second tube, the third tube being above the first tube with a gap between them.

38. The apparatus according to claim 37, wherein the first and third tubes have substantially equal cross sectional dimensions.

39. The apparatus according to claim 37, wherein the first and third tubes have different cross sectional dimensions.

40. The apparatus according to claim 39, wherein the first tube has a larger cross-section than the third tube.

41. The apparatus according to claim 37, wherein the reaction zones extend from the inside of the first tube towards the gap between the first and third tubes and further into the second tube, where the inorganic fullerene-like nanostructures are collected by precipitation on a filter of said collector system.

42. The apparatus according to claim 37, wherein said filter inside the first flow line and said third tube serve as a control system for controlling processes of the diffusion of the first and second reacting agents so as to provide interaction of the metal oxide vapor with the first reacting agent prior to its interaction with the second reacting agent.

43. The apparatus according to claim 37, wherein cross sectional dimensions of the third flow line tube and a length of the gap between the first and third tubes are variable parameters, variation of these parameters allowing for efficient control of the diffusion of the reacting agent into the first tube and thus efficient control of the resulting nanostructures' size.

* * * * *

UNITED STATES PATENT AND TRADEMARK OFFICE
CERTIFICATE OF CORRECTION

| | | |
|---|---|---|
| PATENT NO. | : 7,641,869 B2 | Page 1 of 1 |
| APPLICATION NO. | : 11/326462 | |
| DATED | : January 5, 2010 | |
| INVENTOR(S) | : Tenne et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 616 days.

Signed and Sealed this

Sixteenth Day of November, 2010

David J. Kappos
*Director of the United States Patent and Trademark Office*